United States Patent
Altman et al.

(10) Patent No.: US 10,924,514 B1
(45) Date of Patent: Feb. 16, 2021

(54) MACHINE LEARNING DETECTION OF FRAUDULENT VALIDATION OF FINANCIAL INSTITUTION CREDENTIALS

(71) Applicants: Noah Eyal Altman, Hod HaSharon (IL); Liron Hayman, Hod HaSharon (IL); Shir Meir Lador, Hod HaSharon (IL); Uri Lapidot, Hod HaSharon (IL)

(72) Inventors: Noah Eyal Altman, Hod HaSharon (IL); Liron Hayman, Hod HaSharon (IL); Shir Meir Lador, Hod HaSharon (IL); Uri Lapidot, Hod HaSharon (IL)

(73) Assignee: Intuit Inc., Mountain View, CA (US)

( * ) Notice: Subject to any disclaimer, the term of this patent is extended or adjusted under 35 U.S.C. 154(b) by 295 days.

(21) Appl. No.: 16/118,752

(22) Filed: Aug. 31, 2018

(51) Int. Cl.
| | |
|---|---|
| H04L 29/06 | (2006.01) |
| G06F 21/62 | (2013.01) |
| G06Q 20/40 | (2012.01) |
| G06N 7/00 | (2006.01) |
| G06N 20/00 | (2019.01) |

(52) U.S. Cl.
CPC .......... *H04L 63/20* (2013.01); *G06F 21/6245* (2013.01); *G06N 7/005* (2013.01); *G06N 20/00* (2019.01); *G06Q 20/40* (2013.01); *H04L 63/10* (2013.01)

(58) Field of Classification Search
CPC ......... H04L 63/20; H04L 63/10; G06N 20/00; G06N 7/005; G06Q 20/40; G06F 21/6245
See application file for complete search history.

(56) References Cited

U.S. PATENT DOCUMENTS

| | | | |
|---|---|---|---|
| 9,258,314 B1* | 2/2016 | Xiao | ........................ H04L 63/14 |
| 10,108,968 B1* | 10/2018 | Tekle | .................. G06Q 30/0248 |
| 2010/0169192 A1* | 7/2010 | Zoldi | ..................... G06Q 40/12 |
| | | | 705/30 |

(Continued)

OTHER PUBLICATIONS

Hahn et al., "Vulnerabilities through Usability Pitfalls in Cloud Services: Security Problems due to Unverified Email Addresses", 2012 IEEE 11th International Conference on Trust, Security and Privacy in Computing and Communications, Date of Conference: Jun. 25-27, 2012.*

(Continued)

*Primary Examiner* — Morshed Mehedi
(74) *Attorney, Agent, or Firm* — Ferguson Braswell Fraser Kubasta PC

(57) ABSTRACT

A method for increasing computer network security. A first request to attach a first user account for a software program to an external secure account is received. The first request includes a first set of user credentials for accessing the external secure account and a first unverified email address, the external secure account controlled by a second external computer. After receiving the first request, features having metrics is received. The metrics describe at least creation of the first user account and include at least the first unverified email address. A machine learning model processing the features calculates a probability score that the first request is fraudulent. The probability score is compared to a threshold to form a comparison result. A security action is performed with respect to attaching the first user account to the external secure account in response to the comparison result.

20 Claims, 12 Drawing Sheets

(56) References Cited

U.S. PATENT DOCUMENTS

| | | | |
|---|---|---|---|
| 2010/0281536 A1* | 11/2010 | Richards | H04L 63/1483 726/22 |
| 2015/0067777 A1* | 3/2015 | Heise | H04L 63/0876 726/3 |
| 2015/0095247 A1* | 4/2015 | Duan | G06Q 30/0185 705/318 |
| 2016/0260094 A1* | 9/2016 | Jia | G06Q 20/40 |
| 2018/0121669 A1* | 5/2018 | Motwani | G06F 21/554 |
| 2019/0018956 A1* | 1/2019 | Sadaghiani | G06F 21/577 |
| 2019/0295089 A1* | 9/2019 | Jia | G06N 3/02 |
| 2020/0053121 A1* | 2/2020 | Wilcox | H04L 63/1483 |

OTHER PUBLICATIONS

Wang et al., "Technology-based Financial Frauds in Taiwan: Issues and Approaches", 2006 IEEE International Conference on Systems, Man and Cybernetics, Date of Conference: Oct. 8-11, 2006 (Year: 2006).*

* cited by examiner

| | LEGITIMATE USE | ILLEGITIMATE USE |
|---|---|---|
| PROVIDER A | 20.5% | 56.0% |
| PROVIDER B | 8.9% | 13.2% |
| PROVIDER C | 8.0% | 13.6% |

*FIG. 9*

| EMAIL ADDRESSES WITH NO VOWELS | LEGITIMATE USE | ILLEGITIMATE USE |
|---|---|---|
| PERCENTAGE OF USERS | 0.35% | 3.1% |

*FIG. 10*

MACHINE LEARNING DETECTION OF FRAUDULENT VALIDATION OF FINANCIAL INSTITUTION CREDENTIALS

BACKGROUND

Identity theft and other criminal activity using networked computers, sometimes referred-to as cybercrime, are serious issues in economies increasingly interconnected by computers. Many forms of cybercrime exist. One form of cybercrime involves using illegally obtained lists of secured account information and corresponding user credentials to steal money from the financial institution using computer technology. In another example, a malicious user may illegally obtain a company's list of secured accounts and corresponding security credentials, and then steal data that holds secrets contained in the company's secured accounts.

The lists may be obtained by a variety of means. In some cases, criminals penetrate the network security of a target and electronically steal a list from the target. In other cases, another criminal may purchase or otherwise obtain such a list from some other individual. In still other cases, a malicious actor may write a script that automatically guesses credentials to bank accounts, and thereby create a list.

The lists may be obtained, for example, on the so-called "dark web". The dark web refers to world wide web content that exists on "darknets": Overlay networks that use the Internet but require specific software, configurations, or authorization to access. The networks or websites are "dark" in the sense that the websites are not easily accessed, or even found, without specific knowledge of how to find and access such sites.

SUMMARY

In general, in one aspect, one or more embodiments relate to a method for increasing security in a computer network. The method includes receiving, in a software program executing on a first internal computer, a first request to attach a first user account for the software program to an external secure account. The first request includes a first set of user credentials for accessing the external secure account and a first unverified email address, the external secure account controlled by a second external computer. The method also includes receiving, after receiving the first request and at the first internal computer, a plurality of features comprising a plurality of metrics. The plurality of metrics describe at least creation of the first user account and including at least the first unverified email address. The method also includes calculating, by a machine learning model processing the plurality of features and executing on the first internal computer, a probability score that the first request is fraudulent. The method also includes comparing, by the first internal computer, the probability score to a threshold to form a comparison result. The method also includes performing, by the first internal computer, a security action with respect to attaching the first user account to the external secure account in response to the comparison result.

In general, in one aspect, one or more embodiments relate to a non-transitory computer readable storage medium storing instructions for increasing security in a computer network, the instructions, when executed by a computer processor, comprising program code for receiving a first request to attach a first user account for the software program to an external secure account. The first request comprises a first set of user credentials for accessing the external secure account and a first unverified email address, the external secure account controlled by an external computer. The instructions further comprise program code for receiving, after receiving the first request, a plurality of features comprising a plurality of metrics, the plurality of metrics describing at least creation of the first user account and including at least the first unverified email address. The instructions further comprise program code for calculating, by a machine learning model processing the plurality of features, a probability score that the first request is fraudulent, program code for comparing the probability score to a threshold to form a comparison result, and program code for performing a security action with respect to attaching the first user account to the external secure account in response to the comparison result.

In general, in one aspect, one or more embodiments related to a computer system. The computer system includes a processor and security software executing on the processor. The security software includes a data extractor configured to perform at least one of receiving and extracting a plurality of selected features from a plurality of data sources. The security software also includes a machine learning engine comprising a machine learning model that takes as input the plurality of selected features and has as output a probability score representative of a probability that a given account attachment attempt by the third-party software to the sensitive data account is malicious. The security software also includes an evaluation engine comprising a probability comparator that compares the probability score to a threshold to form an evaluation result. The security software also includes a security action engine configured to perform a security action with respect to the account creator based on the evaluation result.

Other aspects of the disclosure will be apparent from the following description and the appended claims.

BRIEF DESCRIPTION OF DRAWINGS

FIG. 8A, FIG. 8B, FIG. 9, FIG. 10, FIG. 11, FIG. 12, FIG. 13, FIG. 14, and FIG. 15 illustrate examples of features, in accordance with one or more embodiments.

DETAILED DESCRIPTION

Figure 1:
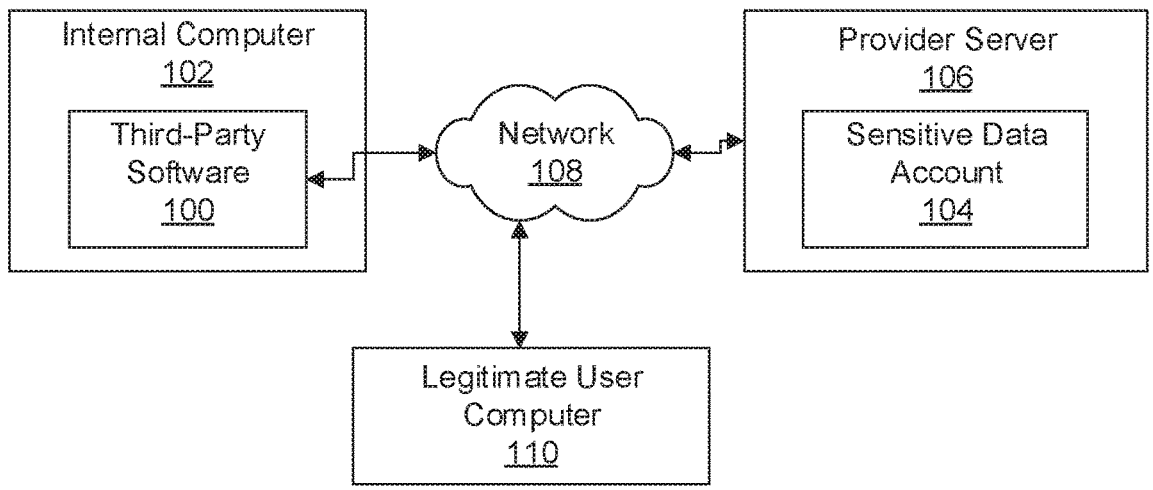
FIG. 1, FIG. 2, and FIG. 3 depict network diagrams, in accordance with one or more embodiments.

Specific embodiments of the present disclosure will now be described in detail with reference to the accompanying figures. Like elements in the various figures are denoted by like reference numerals for consistency.

In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

The embodiments of the present disclosure provide for a technical solution of increasing security in a computer network. The embodiments of the present disclosure are Internet-centric as the embodiments relate, in one example, to preventing malicious users from improperly using third-party software to maliciously attach, over a network, the third-party software to accounts that do not belong to the malicious users. However, the technical use of the embodiments to increase computer and network security are not limited to preventing a malicious user from using the third-party software to access secured accounts via a network, as described with respect to FIG. 5 and different security actions.

By way of a non-limiting example, a legitimate company provides third-party software that helps a user manage finances. With the permissions of the user and of a legitimate provider bank, the third-party software can access a user bank account over a network in order to track both account balance and banking transactions in the user bank account. The user provides security credentials, that the user could use to directly access the bank account, to the third-party software so that the third-party software can access the bank account over the network. The process of establishing communication between the third-party software and the user bank account may be referred to as account attachment.

In addition, the third-party software has its own internal account assigned to the bank account of the user for tracking purposes. The internal account may be associated with some or all of the security credentials, and may also be associated with an unverified email address. The unverified email address is not used as part of the bank's security credentials, but rather is used by the third-party software to communicate with the user or perhaps to serve as a name for the internal account.

Malicious criminals may attempt to take advantage of a particular technical feature sometimes present in the communications between the third-party software and the provider server that manages the bank account of the user. In particular, while the provider server may ordinarily block any user failing a certain number of log-in attempts, the provider server may allow an unlimited number of attachment attempts between the third-party software and bank accounts managed on the provider server.

The criminal behavior starts when a malicious criminal fraudulently obtains a list of user credentials associated with bank accounts managed by the bank's server. However, the malicious criminal does not know which entries on the list are valid. The malicious criminal does not want to attempt to directly communicate with the bank using the user credentials on the list, because the bank's server will lock out the malicious criminal after a certain number of failed attempts caused by invalid user credentials on the list.

In an attempt to defeat this security measure, the malicious criminal writes a software program, sometimes known as a "bot", to automatically create internal accounts within the third-party software and then attempt to find which of the entries on the list are valid by causing the third-party software to make attachment attempts with those secured bank accounts. Again, the bank's server allows the third party software to make an unlimited number of attachment attempts, so failed attachment attempts do not lock out the malicious criminal. Once the malicious criminal knows which entries on the list are valid, the malicious criminal can access the valid accounts and steal information, including possibly money in the bank accounts.

The one or more embodiments described herein address this computer-centric security issue. In particular, the one or more embodiments use machine learning and information gathered from the third-party software and from other sources to determine a probability that a given account attachment attempt is malicious or a probability that a subsequent account attachment attempt is malicious. A security action is taken when malicious activity is deemed probable, such as to block a user's access to the third party software or to direct the malicious criminal to a false bank account.

Attention is now turned to the figures. The following figures and descriptive text provide more detail regarding the above-identified issue, as well as regarding the solution summarized above.

FIG. 1 is a network diagram illustrating how a legitimate user can use third-party software to attach to a sensitive data account on a provider server, in accordance with one or more embodiments. Third-party software (100) executed on internal computer (102) provides access to sensitive data account (104) on provider server (106) via network (106). Network (106) may be one or more wired or wireless connections, and possibly intervening computers between legitimate user computer (110) and provider server (106).

The following definitions apply to the description of FIG. 1 and elsewhere herein. "Third-party software" is defined as is software owned by or licensed by a party distinct from the provider and the legitimate user. The third-party software (100) is useful for manipulating the data in sensitive data account (104) in a manner not provided by the provider server (106). Whatever user interface and software tools that the third-party software (100) provides, the third-party software (100) requires access to the sensitive data in sensitive data account the sensitive data account (104) in order to operate, in some embodiments, in a desired manner. Thus, as a result of an agreement between the third-party software provider and the owner of the provider server (106), the provider server (106) is programmed to grant the third-party software (100) the right to attach to the sensitive data account (104) in order to obtain the sensitive data contained therein. Possibly, the provider server (106) is programmed to permit the third-party software (100) to manipulate the user's financial accounts, such as but not limited to transferring funds to other accounts that are possibly not owned or managed by the provider server (106).

The phrase "attach third-party software to an account", "attach", or "account attachment" all mean using third-party software to gain ongoing access to a sensitive data account serviced by a provider. As an example, the third-party software (100) may be financial management software which attaches to user's online bank account so that the third-party software can download the user's financial data into the third-party software (100), possibly on an ongoing basis.

"Internal computer" is defined as the computer executing third-party software, and is maintained by the owner or licensee of the third-party software. However, the third-party software (100) may be instantiated on legitimate user computer (110) in some embodiments.

"Provider server" is defined as the computer programmed to manage or manage access to the sensitive data account (104). "Network" is defined with respect to FIG. 16A and FIG. 16B. "Legitimate user computer" is defined as the computer with which a legitimate user communicates with only the internal computer (102) over the network (108), with only the provider server (106) over the network (108), or possibly both the internal computer (10) and the provider server (106) over the network (108).

Account attachment is "legitimate" if the user intends to gain proper access to the account. Thus, a "legitimate user computer" is considered "legitimate" if the computer is controlled with proper intent. Account attachment is "malicious" if the user intends to gain improper access to the account. Thus, a "malicious user computer" is considered "malicious" if the computer is controlled by a person with improper intent. An example of improper access or intent is a user not owning the account and not having permission to access the account from the account owner. An example of proper access or intent is a user owning access rights to the sensitive data account (104) and accessing the sensitive data account (104).

By way of another example, a "legitimate" user is one who has legal authority to access the account. For example, legal authority may be based on ownership, express or implied agency, court order, or other form of legal means by which the user has the legal right to access the account. In contrast, a malicious user is one who does not have legal authority to access the account and is using nefarious techniques to obtain access.

The third-party software (100) is not limited to financial software. For example, the third-party software (100) may be a software program for computer assisted design (CAD) and the sensitive data account (104) may contain CAD data related to the design and manufacture of a product that is considered secret by the owner of the provider server (106). In this case, the legitimate user computer (110) may be operated by an engineer having legitimate access to sensitive data account (104). In another example, the third-party software (100) may be a software program for analyzing military or intelligence data and the sensitive data account (104) contains such data. In this case, the legitimate user computer may be operated by an agent or analyst having legitimate access to the sensitive data account (104). Other examples and uses of third-party software (100) are contemplated, and thus the examples provided above do not necessarily limit the other examples or the claims, below.

Figure 2:
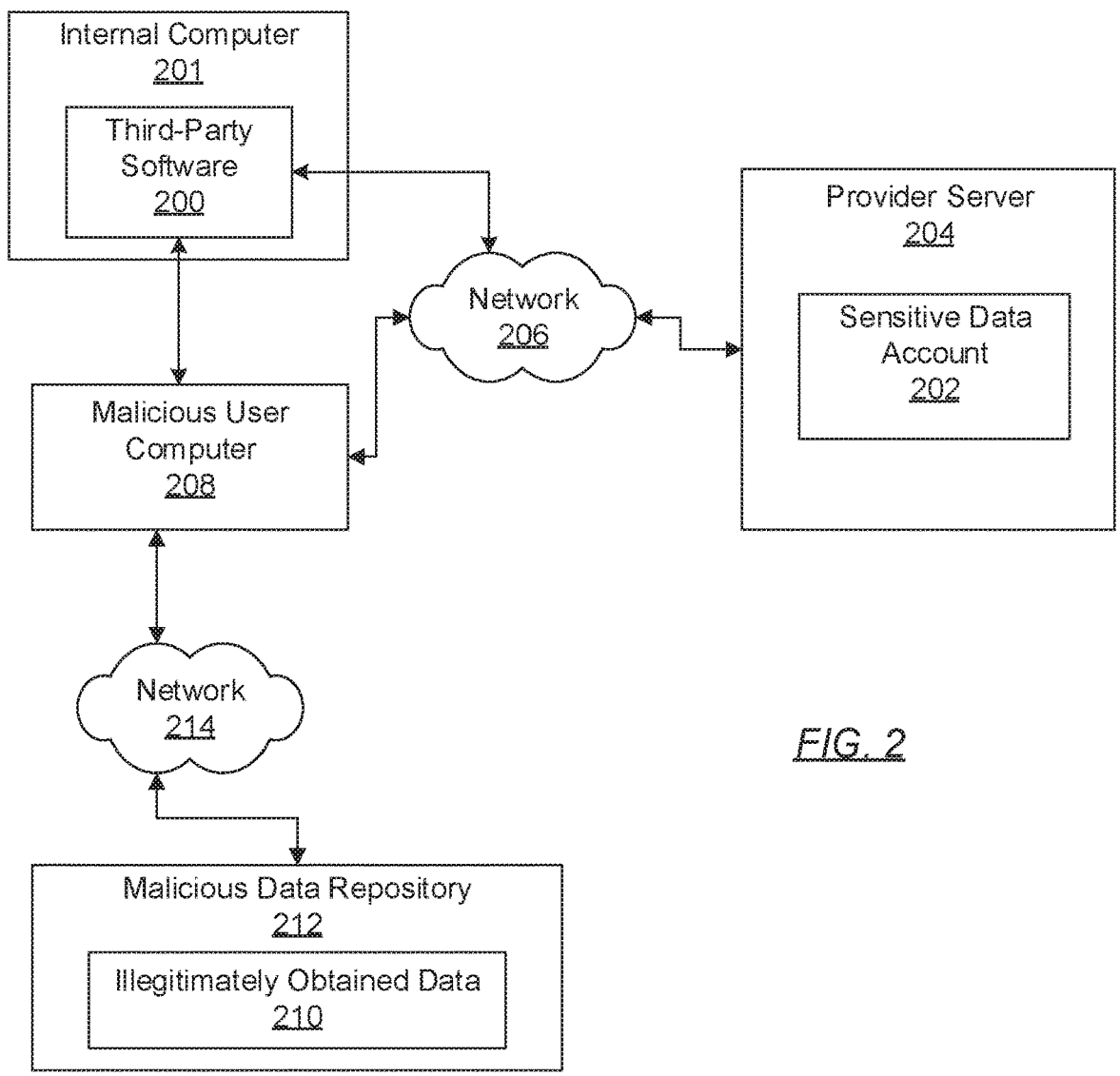

FIG. 2 is a network diagram illustrating how a malicious user can use the third-party software to attach to the sensitive data account on the provider server, in accordance with one or more embodiments. FIG. 2 illustrates one manner in which a malicious user may attempt to use the third-party software (100) of FIG. 1 to gain illegitimate or illegal access to the sensitive data in the sensitive data account (102) of the provider server (104). Thus, in FIG. 2, the third-party software (200) may be equivalent to the third-party software (100) of FIG. 1, and likewise the internal computer may be equivalent to the internal computer (101); the sensitive data account (202) may be equivalent to the sensitive data account (102); the provider server (204) may be equivalent to the provider server (104); and the network (206) may be equivalent to the network (106).

In FIG. 2, malicious user computer (208) is used to access or execute the third-party software (200) to gain illegal or illegitimate access to the sensitive data account (202). The malicious user does so by illegally or illegitimately using the third-party software (200) to attach to the sensitive data account (202) on the provider server (204) via the network (206).

In some embodiments, the malicious user can gain one or more perceived advantages using the third-party software (200) rather than directly attempting to steal information from the provider server (204) via the network (206). For example, the provider server (204) may grant the third-party software (200) unlimited accesses the sensitive data account (202) on the provider server (204) via the network (206). Furthermore, the provider server (204) may grant the third party software (200) unlimited network access to all sensitive data accounts on the provider server (204) via the network (206).

In a specific example, the provider server (204) may permit only a few attempts to connect to the sensitive data account (202) when the provider server (204) is directly accessed via the network (206); however, the provider server (204) may permit many or perhaps an unlimited number of attempts by the third-party software (200) to attach the third-party software (200) to the sensitive data account (202).

In another specific example, the provider server (204) may require a verified email address to permit direct access to the sensitive data account (202) via the network (206); however, no such verified email address may be required when the third-party software (200) attempts to attach to the sensitive data account (202). In still another specific example, the provider server (204) may be programmed to detect fraudulent use of the sensitive data account (202) or other accounts managed by the provider server (204); however, the provider server (204) may not be able to distinguish fraudulent from legitimate activity on the provider server (204) when the third-party software (200) is requesting data access or manipulation from the provider server (204).

A still more particular example is now provided regarding how a malicious user may use the malicious user computer (208) and the third-party software (200) to illegitimately or illegally attach accounts in the third-party software (200) to the sensitive data account (202). In this example, the malicious user gains access to the illegitimately obtained data (210) on the malicious data repository (212) via the network (214).

Illegitimately obtained data (210) is a list of user accounts managed by the provider server (204), together with corresponding user credentials (i.e., "user names", "passwords", security certificates, or other credentials needed to obtain access to many sensitive data accounts on the provider server (204)). This list may have been directly taken from the provider server computer (204), or perhaps purchased from or otherwise obtained from another malicious user who operates or has access to the malicious data repository (212).

This list contains both accurate information and inaccurate information. For example, this list may contain expired accounts, accounts with typographical errors, accounts where user name or password has changed between the time the list was generated and the time the malicious operator of the malicious user computer (208) obtained the list, or for other reasons. The malicious operator of the malicious user computer (208) does not know which entries on the list are accurate and which are not accurate.

In most cases, the operator of the malicious user computer (208) desires to maximize the amount of money stolen or the amount of data stolen from the provider server (204). The malicious user does not desire to access the provider server (204) server directly, because the provider server (204) has security measures the malicious user cannot easily overcome. For example, after two or three failed attempts to attach to sensitive data accounts on the provider server (204) (due to entry of incorrect user credentials from the list), the provider server (204) may be programmed to block the internet provider address of the malicious user computer (208), or otherwise shut out the access of the malicious user computer (208) to the provider server (204). Because the malicious user does not know how many, or which, of the entries on the list are accurate, the malicious user may be locked out or slowed down long before he or she is able to attempt use of all of the entries of the list.

Thus, one method the malicious user may use to attempt to circumvent this security is to use the third-party software (200) to attach to sensitive data accounts on the provider server (204), such as the sensitive data account (202). In this specific example, the provider server (204) is programmed to permit the third-party software (200) an unlimited number attempts to attach the third-party software (200) to accounts managed by the provider server (204).

In this case, the malicious user writes a software program, sometimes referred-to as a "bot". The bot is programmed to interface with the third-party software (200) in a manner that rapidly and automatically attempts to attach the third-party software (200) to the accounts on the list that are managed by the provider server (204). In this manner, the malicious user can quickly discover which entries on the list are accurate. Armed with this information, the malicious user can then steal money or sensitive information from more of the sensitive data accounts managed by the provider server (204), relative to the same attempt to steal by directly accessing the provider server (204).

Stated in the context of a specific example, the provider server (204) is fooled into thinking that the actual legitimate users are manipulating data in the legitimate users' sensitive data accounts, even though many erroneous attachment attempts are being made. Thus, the malicious user can very rapidly drain the financial accounts of many users, or steal secret or sensitive information. The actual access or attachment of the third-party software (200) to the sensitive data accounts, such as the sensitive data account (202), may or may not be the means by which the malicious user steals sensitive data. The danger in this example is that the malicious user circumvents the security on the provider server (204) to verify which accounts on the list are both active and have current user credentials. In this manner, the malicious user can subsequently access such sensitive data accounts managed by provider server (204) in whatever manner the malicious user desires, and provider server (204) cannot distinguish this illegitimate access from legitimate access to the sensitive data accounts fast enough to stop the malicious user.

A still more specific example is now provided. In this example, again, the malicious user has obtained a list of account information and corresponding user credentials from the malicious data repository (212) via the network (214), which in this example is the "dark web." In this example, the third-party software (200) requires only three types of information to attach the third-party software (200) to the sensitive data account (202) and other sensitive data accounts managed by the provider server (204). These three pieces of information are user name, user password, and user email address. The email address is not verified by the third-party software (200), and is never seen by the provider server (204). In other words, the user may enter a fake email address if the user chooses, though legitimate users will usually enter a real email address in order to take full advantage of the features and tools of the third-party software (200).

In this specific example, the malicious user computer (208) executes a bot that generates a random email address for each user account, and then automatically creates accounts in the third-party software (200) using the user names and passwords obtained from the stolen list obtained from the malicious data repository (212), together with the randomly generated email addresses. The bot also commands the third-party software (200) to attempt to attach each of these automatically created user accounts in the third-party software (200) to corresponding sensitive data accounts in the provider server (204). Thus, for example, the bot automatically orders the third-party software (200) to attach a newly created user account to the sensitive data account (202) using the corresponding user name and password from the illegitimately obtained list.

If the third-party software (200) successfully attaches the user account created for the third-party software (200) to the sensitive data account (202), then the malicious user knows that user name and password are valid and connect to a current account. The malicious user may then order the bot to transfer that user name and password to a list of verified accounts, or alternatively use the third-party software (200) to access, manipulate, or steal the sensitive data in the sensitive data account (202). The malicious user can also use the verified account information to directly access the sensitive data account (202) via a direct connection to the provider server (204) via a user interface managed by the provider server (204). The malicious user can also sell the verified account information to some other malicious user, publish the account information or stolen information to embarrass users, or take some other malicious action.

Other malicious uses for the third-party software (200) are possible. For example, the third-party software (200) could be used to place false data into the sensitive data account (202). Thus, methods and devices for stopping malicious the user computer (208) from abusing the third-party software (200) are desirable. Preferably, such methods and devices should be independent of the security measures taken by the provider server (204).

Figure 3:
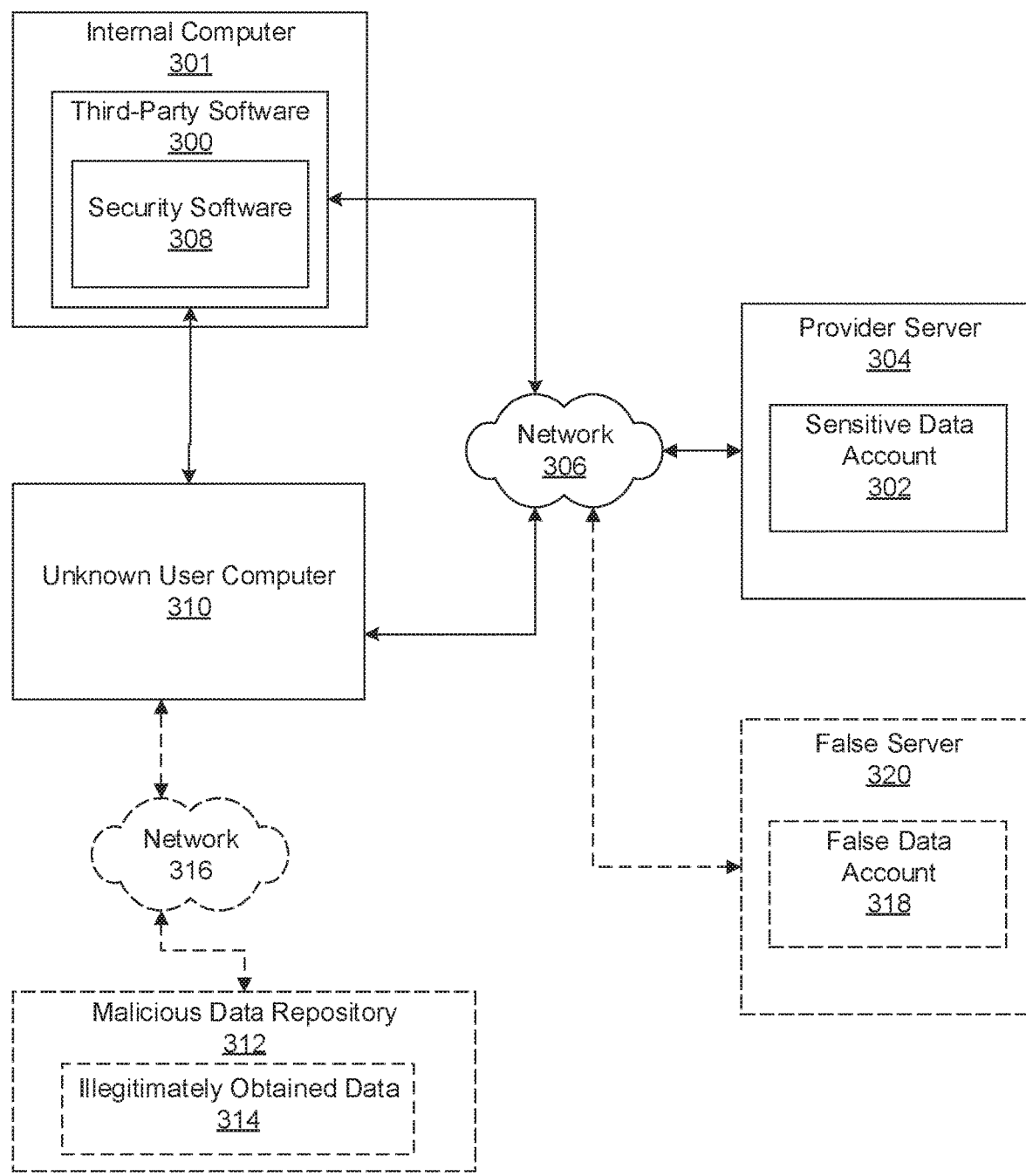

FIG. 3 is a network diagram illustrating how security software operating with the third-party software can prevent a malicious user from attaching to the sensitive data account, in accordance with one or more embodiments. Third-party software (300) may be the third-party software (200) of FIG. 2 or the third-party software (100) of FIG. 1. More generally, FIG. 3 is similar to FIG. 2, in that the internal computer (301), the sensitive data account (302), the provider server (304), the network (306), the malicious data repository (314), the illegitimately obtained data (314), and the network (316) all correspond to similar features in FIG. 2, FIG. 1, or both, as appropriate.

However, FIG. 3 is different than FIG. 1 or FIG. 2 in two main respects. First, the security software (308) operates either as part of the third-party software (300) or in conjunction with the third-party software (300). Second, whereas in FIG. 1 the local computer accessing the third-party software (300) was assumed to be either legitimate (the legitimate user computer (108) in FIG. 1) or malicious (the malicious user computer (208) in FIG. 2), in this case the unknown user computer (310) is labeled as such because the third-party software (300) cannot initially distinguish whether this computer is operated by a legitimate user or a malicious user. Thus, for example, the unknown user computer (310) may or may not be connected to the malicious data repository (312) having the illegitimately obtained data (314) via the network (316). Only in rare cases will the security software (308) be programmed to know that, prior to access attempts by the unknown user computer (310), this computer is malicious or legitimate.

Attention is first turned to describing the operation of the security software (308) in general terms. Security software is software, related to the third-party software (300), that includes functionality to execute one or more machine learning models to determine whether an unknown user computer is for a malicious user or a legitimate user. In summary, the security software (308) analyzes each attempt by the unknown user computer (310) (or any other computer) to create and/or attach an account in the third-party software (300) to the sensitive data account (302) on the provider server (304). The security software (308) determines a probability that the account creation and/or attachment attempt is legitimate or illegitimate. In one or more embodiments, the probability is a probability that the account creation is illegitimate. If this probability is below a threshold, the third-party software (300) continues normal operation of the third-party software (300). If this probability is above the threshold, the third-party software (300) orders a security action, as described further below. One skilled in the art will appreciate that the inverse may be used, and the probability may be the probability that the account creation is legitimate. In such a scenario, the determination is whether the probability is above a threshold to continue operation. Most generally, the security software (308) compares the probability to a threshold, and takes an action— which may be either to permit normal access to the third-party software (300) or to take some other security action.

Figure 4:
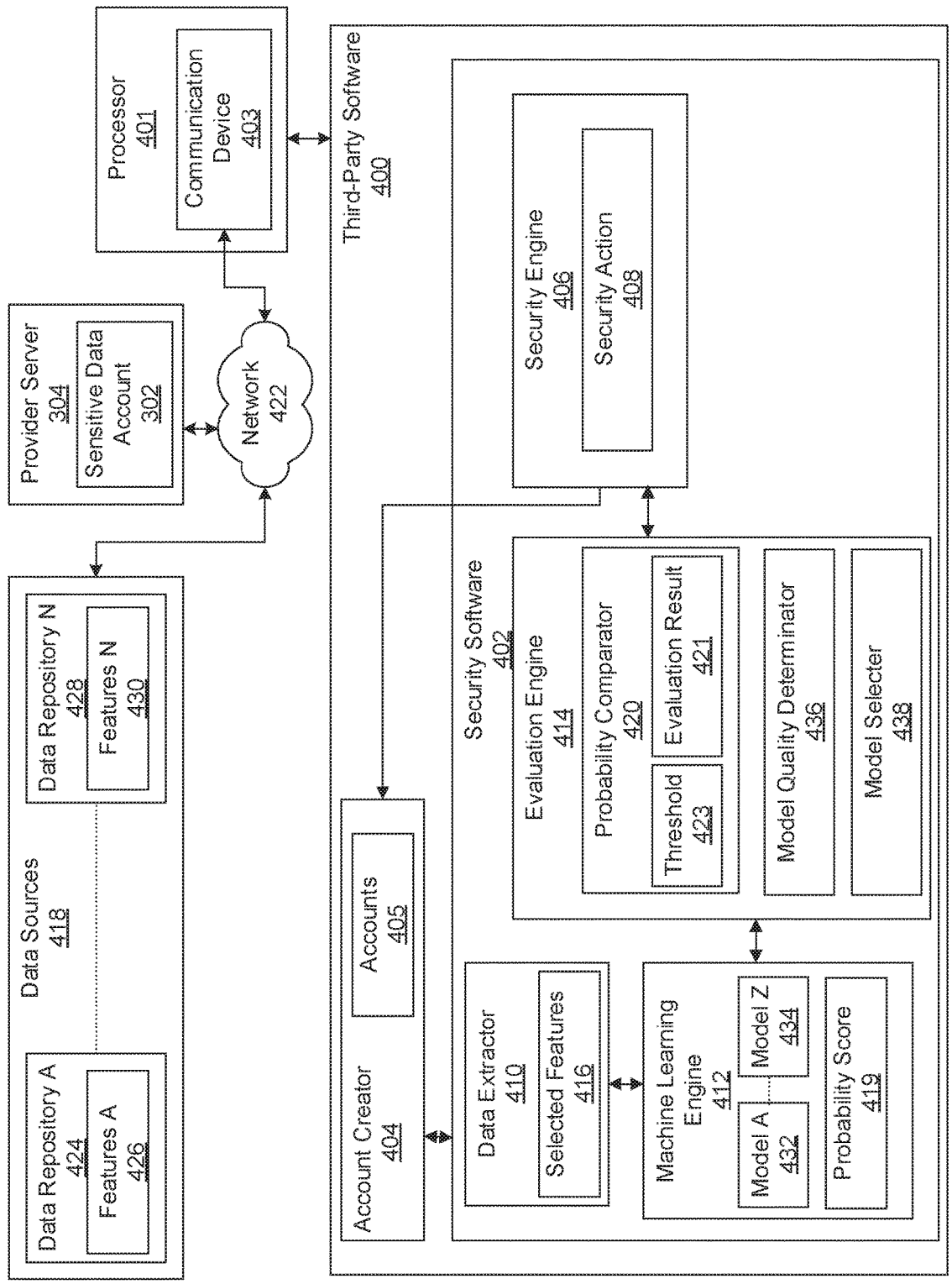
FIG. 4 is a system diagram, in accordance with one or more embodiments.

FIG. 4 is a system diagram illustrating the security software shown in FIG. 3, in accordance with one or more embodiments. Thus, the third-party software (400) may be the third-party software (300) of FIG. 3, the third-party software (200) of FIG. 2, or the third-party software (100) of FIG. 1. The security software (402) may be the security software (308) of FIG. 3. In summary, FIG. 4 is directed towards an exemplary architecture of the security software (402). This architecture is part of the overall security system which improves computer and network security, as described with respect to FIG. 3.

The third-party software (400) executes on processor (401), which may be characterized as an internal computer. Processor (401) also receives data, such as the features A (426) through features N (430) from the data sources (418) via network (422) and communication device (403). The third-party software (400), including the security software (402), is stored as program code on a non-transitory computer readable storage medium and executable by the internal computer.

The security software (402) is in communication with the account creator (404). The third-party software (400) uses the account creator (404) to create the accounts (405) that are specific to the third-party software (400). Each account in the accounts (405) requires a user credentials (a user name, a password, a security certificate, some other security protocol, or combinations thereof). A user, such as any of the user computers described in FIG. 1 through FIG. 3, provides the required user identifier and user credentials when prompted by the third-party software (400).

In the example of FIG. 4, each account in the accounts (405) is associated with an unverified email address provided by the user of the third-party software (400). The association may be a stored link between the account and the unverified email address. This unverified email address may or may not be the user identifier, but may be nevertheless required by the third-party software (400). Each account may also or alternatively have other information and features which permit attachment to a sensitive data account operating on a provider server, such as described with respect to FIG. 1 through FIG. 3.

Attention is now turned to the security software (402). One feature of the security software (402) is the security engine (406), which is programmed to take the security action (408) when the probability score (419) associated with a requested account creation via the account creator (404) exceeds threshold (423). The probability score (419) is the probability that a given account creation request is malicious. This process is described above with respect to FIG. 3. The security action (408) may be any of the security actions described above with respect to FIG. 3.

Additionally, the security software (402) may include features for calculating the probability score (419). Thus, for example, the security software (402) may include data extractor (410), machine learning engine (412), and evaluation engine (414). As a broad overview, the data extractor (410) extracts selected features (416) from data sources (418). A "feature" or "features" is a type of information which is useful in determining whether a given account creation attempt is legitimate or malicious. Different types of features, uses of features, and the importance of different features are described further below, and also in FIG. 8 through FIG. 15. Each feature is associated with one or more corresponding metrics. As used herein, a "metric" is data useable by a computer for comparison to other metrics or to rules or policies.

In turn, the machine learning engine (412) uses a machine learning model (such as machine learning model A (432)) to calculate, taking the selected features (416) as input, a probability score (419) that a given account creation attempt is malicious. The evaluation engine (414) takes as input the probability score (419) and uses probability comparator (420) to compare the probability score (419) to a threshold (423). The threshold may be user-specified, calculated by the machine learning engine (412), or provided by a third-party. The threshold may be either dynamic or static. In any case, a comparison or evaluation result (421) is generated; that is, a determination whether the probability score meets, equals, or exceeds the threshold.

The security engine (406) takes as input the comparison or the evaluation result (421). Based on the comparison or the evaluation result (421), the security engine (406) takes the security action (408), as described with respect to FIG. 3. The security engine (406) may communicate with or order the account creator (404) to implement the security action. The security engine (406) may communicate with or order actions to other computers or user devices via network (422), which may be the network (306) of FIG. 3 or some other network. The security engine (406) may take other security actions, as described above.

Attention is returned to the data sources (418). Again, the data sources (418) contain features from which the data extractor (410) extracts the selected features (416). The data extractor (410) may be programmed to look for specific features contained in the data sources (418).

The data sources (418) may include a variety of data sources, including data repository A (424) having features A (426). As used herein, the term "data repository" refers to a non-transitory computer readable storage medium. Many such data repositories having many different types of features may be present, as indicated by the dotted line between data the repository A (424) and data repository N (428) having features N (430).

Specific examples of features are provided in FIG. 8 through FIG. 15. Thus, "features" may be taken from unknown user computer (310) of FIG. 3, from the server operating the third-party software (400) in the case that the third-party software (400) is a web-based program, from provider server (304) of FIG. 3, or even from the network (316) and the malicious data repository (312) of FIG. 3. Thus, one source for features which the data extractor (410) may extract may be the very list of accounts and user names obtained by the malicious user. Of course, the owner or manager of the third-party software (300) only uses such a list only for security purposes and may accordingly notify the owner or operator of the provider server (304), law enforcement, or both. Other information may also be obtained from the so-called "dark web" and used features. For example, the fact that a criminal hacker boasts of a crime he or she committed on a dark website may be discovered and extracted as one of many of the selected features (416). Other features may include the physical location of the login attempt, a history of past attempts to attach accounts, lists published on the dark web, the number of providers attached via the third-party software (400), the number of failed attempts to attach to the sensitive data account (302), the time since the last attachment attempt, the time since account creation, the time of day, metadata from user accounts, the internet protocol (IP) address of the user computer, the nature of transactions performed between the third-party software (400) and the sensitive data account or between the third-party software (400) and the provider server, and others.

In one embodiment, the selected features (416) includes the unverified email address required by the account creator (404). To date, ordinary artisans have considered unverified emails to be of little value for use with security protocols, because creating a fake unverified email address is a trivial exercise for a criminal hacker, and a fake email address usually is not and cannot be verified.

For example, unverified email addresses that include no vowels, or that are nonsensical are more likely to be fake email addresses created by malicious users during illegitimate use of the third-party software (400). Fake email addresses may follow other patterns that are discernable by machine learning, such as patterns (or the lack thereof) in alphanumeric character combinations. Thus, one or more embodiments of the present disclosure provide for using an unverified email address as one feature among possibly many of the selected features (416) when determining probability score (419).

Attention is now turned to use of selected features the selected features (416). In particular, the machine learning engine (412) takes as input the selected features (416). The machine learning engine (412) may have one or more machine learning models, including model A (432) through model Z (434). More or fewer machine learning models may be present. Each machine learning model may be a particular machine learning algorithm.

For example, one machine learning model may use XGBoost, another may use a random forest algorithm, another may use a feed forward algorithm, another may use a decision tree learning algorithm, another may use association rule learning, another may use artificial neural networks, another may use deep learning, another may use inductive logic programming, another may use support vector machines, another may use clustering, another may use Bayesian networks, another may use reinforcement learning, another may use representation learning, another may use similarity and metric learning, another may use sparse dictionary learning, another may use genetic algorithms, another may use rule-based machine learning, another may use learning classifier systems, and another may use feature selection approach techniques. Other machine learning models may be used.

In one or more embodiments, only a single machine learning model is used during ongoing monitoring of the third-party software (400). However, the selection of which machine learning model to use may change, and in some cases multiple machine learning models may be combined during ongoing monitoring of the third-party software (400). Selection of the machine learning model to be used is described below.

The single machine learning model, such as model A (432), is selected because that model produces the most accurate determination relative to the other models. One machine learning model may work better than others in one situation, but another machine learning model may work better in a different situation. For example, some machine learning models work better on larger data sets, some work better on smaller data sets. Some machine learning models work better on one kind of information, others on a different kind of information. Thus, the embodiments contemplate using and maintaining many different machine learning models in the machine learning engine (412), even though typically only one machine learning model is used during runtime monitoring of account creation activity by the third-party software (400).

Whichever machine learning model is used, the selected machine learning model takes as input the selected features (416). The algorithm of the machine learning model is applied to the selected features (416). The output of the algorithm is probability score (419), the probability score reflecting the probability that a given account creation attempt is malicious. Then, probability comparator (420) compares the probability score (419) to a threshold (423) to form a comparison or the evaluation result (421). The security engine (406) then takes the security action (408) depending on the comparison or the evaluation result (421).

Attention is now turned to training the machine learning engine (412) and the models therein. One or more embodiments of the present disclosure provide for training the machine learning models using supervised learning. Supervised learning is the machine learning task of learning a function that maps an input to an output based on example input-output pairs. The machine learning model then infers a function labeled "training data" including a set of training examples. In supervised learning, each example is a pair made of an input object (typically a vector) and a desired output value (also called the supervisory signal). A supervised learning algorithm analyzes the training data and produces an inferred function, which can be used for mapping new examples. An optimal scenario will allow for the algorithm to correctly determine the class labels for unseen instances. The algorithm can generalize unseen situations from the training data.

Thus, for example, a given machine learning model can be provided with an example of features for which a malicious account creation or attachment is defined to be occurring. The machine learning model is trained to find patterns among these features according to the process described above. Then, when new (unknown) selected features (416) are provided as input to the trained machine learning model, that machine learning model can accurately evaluate a probability that the account creation attempt is malicious.

One or more embodiments of the present disclosure also provide for a process for evaluating which of many machine learning models performs best in a given situation. Thus, for example, Model A (432) through Model Z (434) may be trained as described above. Then, each of these models may be provided with one or more new sets of features associated with account creation or attachment attempts that are known (for test purposes only) to be malicious or legitimate. Model quality determinator (436) may then determine which machine learning model has the best quality. The machine learning model that has the best quality is the model that most accurately predicts probability scores most closely corresponding to the true malicious or legitimate nature of the test sets of features. Model selector (438) then selects this highest quality model to be the machine learning model used to determine probability scores for real incoming account creation and attachment requests via the third-party software (400).

One or more embodiments of the present disclosure provide for re-evaluating and retraining the machine learning models. Therefore, in some embodiments, the precise machine learning model used to generate the probability score may change from time to time, depending on the particular network environment in which the third-party software (400) is operating.

In a variation, the probability score determined by the machine learning algorithm is not a probability that the current account creation or attachment request is malicious. Rather, the probability score may be a probability that the next account creation or attachment request is malicious. Thus, in this example, a first request may be permitted automatically, but subsequent requests may be subject to evaluation and possible security actions. This technique is another method for making the third-party software (400) more "lenient" for legitimate users.

In a variation, multiple machine learning models may be used simultaneously during monitoring of the third-party software (400) by the security action (408). In this case, a composite probability score can be generated by taking an average, possibly a weighted average, of the probability scores generated by the multiple machine learning models. Alternatively, a single score can be selected from among many scores according to a model evaluation scheme, such as selecting the model to use in real time based on the type of features that were extracted by the data extractor (410), and then using that model to determine the probability score.

Figure 5:
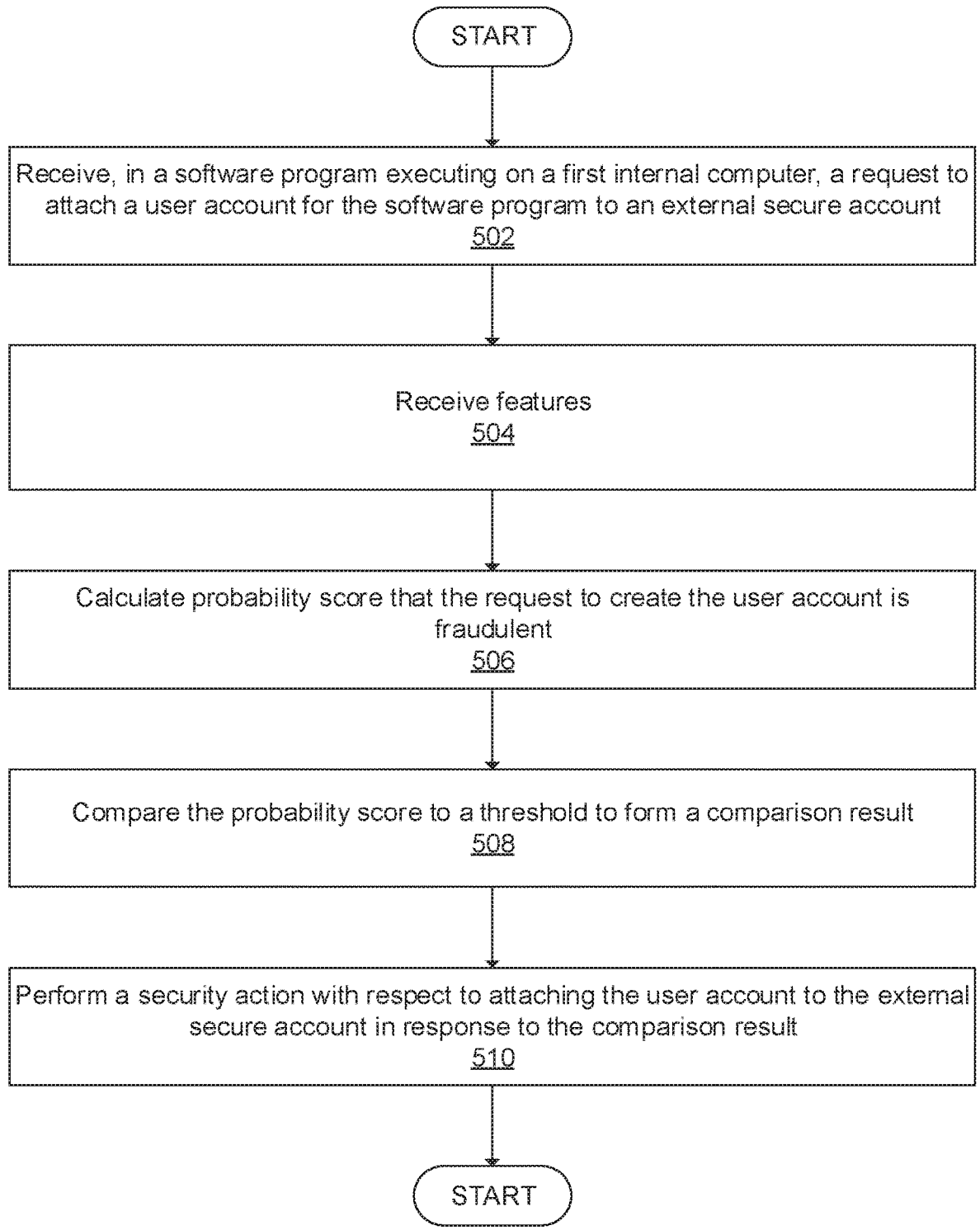
FIG. 5, FIG. 6, and FIG. 7 are flowchart diagrams, in accordance with one or more embodiments.
Figure 6:
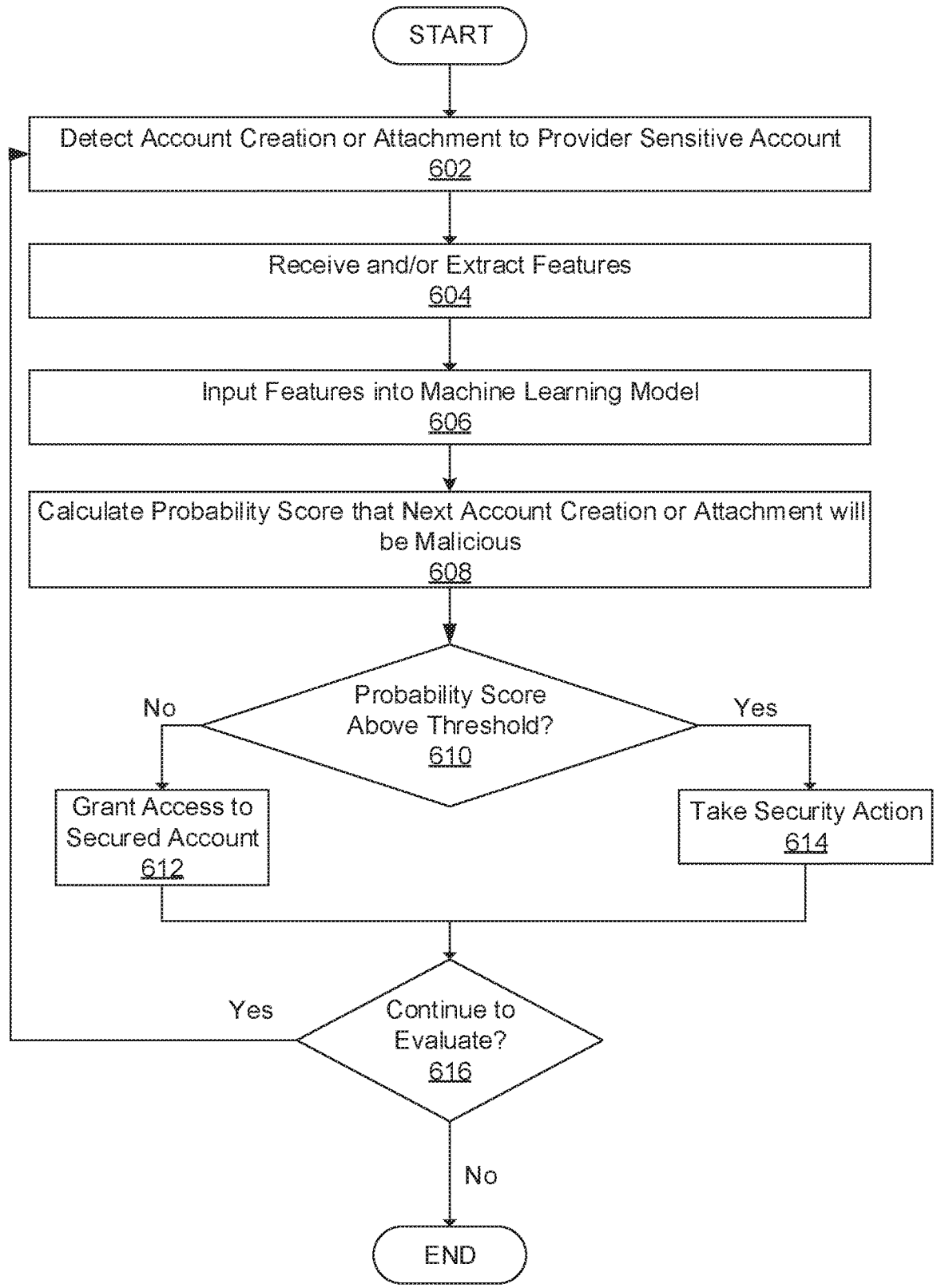
Figure 7:
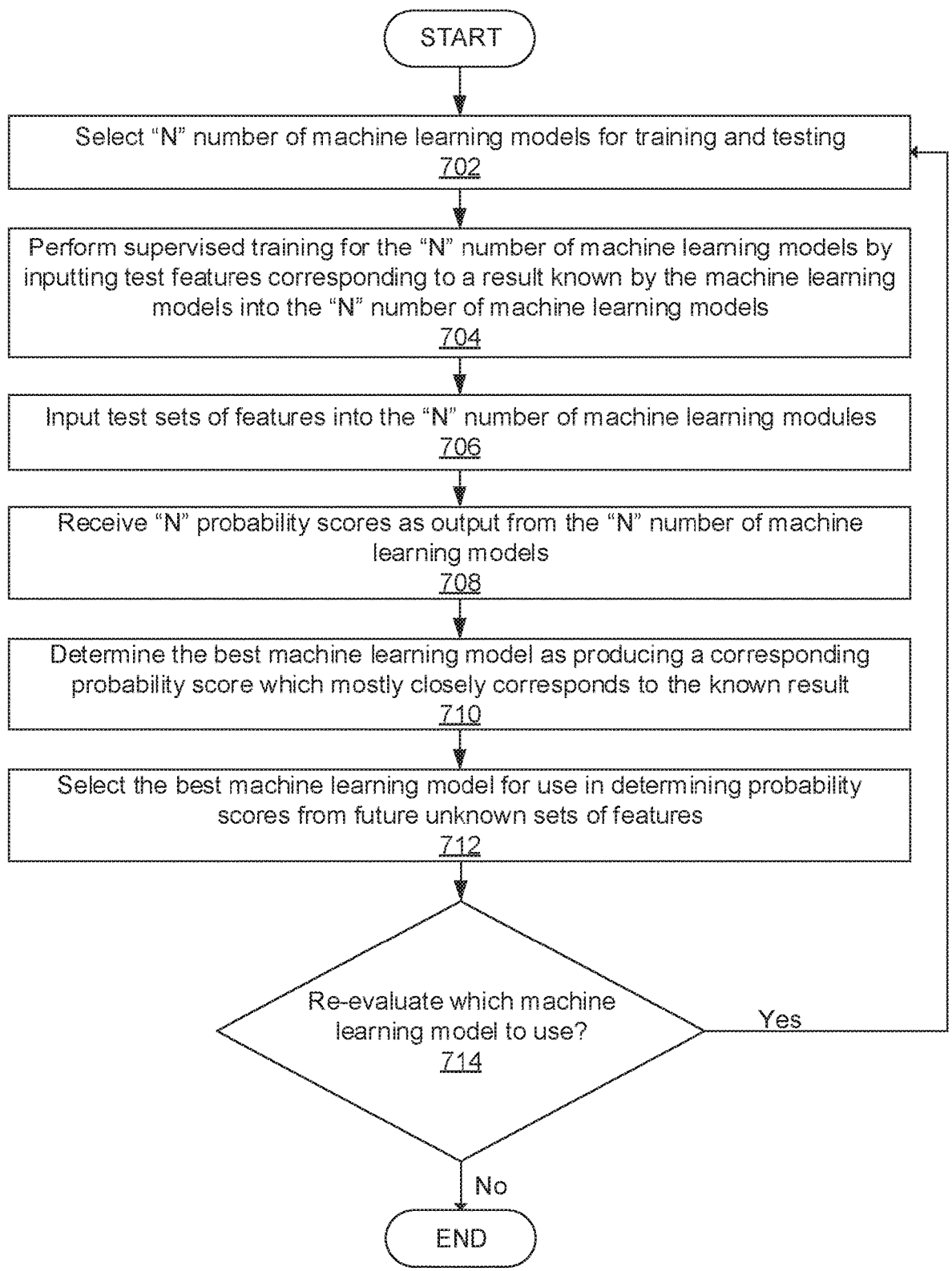

FIG. 5, FIG. 6, and FIG. 7 show flowcharts in accordance with one or more embodiments. While the various operations in these flowcharts are presented and described sequentially, one of ordinary skill will appreciate that some or all of the operations may be executed in different orders, may be combined or omitted, and some or all of the operations may be executed in parallel. Furthermore, the operations may be performed actively or passively.

FIG. 5 is a flowchart diagram of a computer-implemented method for increasing security in a computer network, in accordance with one or more embodiments. The method of FIG. 5 may be implemented by security software, such as security software (308) of FIG. 3 or the security software (402) of FIG. 4, executed by a processor, such as processor (401) of FIG. 4 or computing system 1600 of FIG. 16A and FIG. 16B. Thus, the method of FIG. 5 may be implemented by an internal computer, such as the internal computer (301) of FIG. 3. The method of FIG. 5 is a variation of the techniques and procedures described above. The method of FIG. 5 may be characterized as a method for increasing security in a computer network.

In step (502) a first request is received to attach a user account for the software program, executing on an internal computer, to an external secure account. The software program may also create the user account. As another example, the request to attach may be performed after the user account is created. The attach and/or create may include the account information, the user credentials, and the unverified email address provided by the user's computer. The user account is not communicated to the provider, but it is associated with the sensitive data account managed by the provider. In some cases, the intent of creating the user account is to attach the user account to the sensitive data account so that the software program can use the data in the sensitive data account. Note that a malicious user may attempt account attachment sometime after account creation in the third-party software: possibly days, weeks, or months later.

The user's computer typically accesses the third-party software over a network via a web browser. However, the user's computer may execute the third-party software in the case that the third-party software is instantiated on or otherwise installed on legitimate user computer.

In a non-limiting example, the third-party software may be financial management software, the provider server may be a server operated by a bank, and the sensitive data account may include financial data belonging to the legitimate user using the legitimate user computer. In this case, the third-party software provides the legitimate user with financial software tools for manipulating and analyzing the legitimate user's finances. For example, the bank may not provide the user with financial planning software tools, spending analysis software tools, or the like. The bank also may provide an account manipulation user interface that the user disfavors, and the third-party software provides the user with an improved user interface for manipulating the user's financial affairs with the bank.

In step (504), features are received. The features include metrics describing at least creation of the first account and including at least the first unverified email address (operation (504)). Examples of features are provided with respect to FIG. 8 through FIG. 15. In summary, the features are data that has some correlation to determining whether a given attachment request is more likely to be malicious or more likely to be legitimate. An example of such a feature is the structure of the unverified email address requested during account creation; unverified email addresses that are nonsensical to a human reader (such as having no vowels) are more likely to correlate to a malicious attachment attempt.

In step (506), a probability score that the request is fraudulent is calculated. The computer calculates the probability score using a machine learning model processing the plurality of features with respect to creation of the user account. A description of the operation of the machine learning model is provided below with respect to FIG. 7.

In summary, the machine learning model takes as input the features received in step (504), analyzes both the features and patterns in the features, and draws a conclusion as to the probability that a given attachment attempt or the next attachment attempt is malicious. The more features that correlate to malicious intent, the higher the probability score that the attachment attempt is malicious or that a subsequent attachment attempt will be malicious.

Additionally, certain combinations of features may be used to infer an even higher probability score. For example, consider the case that both the time of the account attachment attempt and the consonant-only nature of the unverified email address correspond to an increase chance of malicious intent. Then, the fact that both features are present at the same time can be used to calculate an inference that the probability of malicious intent is higher than either probability alone would suggest, possibly even higher than the summed probabilities inferred by considering the features individually, rather than as a whole.

In step (508), the probability score is compared to a threshold to form a comparison result. The threshold is provided to the computer, or may be calculated or adjusted automatically based on a variety of factors, such as the features described in FIG. 8 through FIG. 15, or according to the judgement of a human technician.

In step (510), a security action is taken with respect to attaching the first user account to the external secure account in response to the comparison result. In one embodiment, the method terminates thereafter.

The security action may take many forms. For example, the embodiments of the present disclosure may be used to create a so-called "honeypot". As used herein, the term "honeypot" is defined as a computer security scheme in which a malicious user is directed to a decoy server or decoy accounts which fool the malicious user into thinking he or she has gained access to the real server and real accounts. The malicious user can then be monitored and perhaps tracked electronically, or even in some cases tracked to the physical location of the computer the malicious user is using.

In the case that the third-party software is a web-access program, the security action may be to block the unknown user computer from accessing the third-party software. In another example, in the case that the third-party software is installed on the unknown user computer, the security action may be to lock operation of the third-party software or even remove the third-party software from the unknown user computer.

The security action may be to report unknown user computer to an authority, such as a security division of the operator of provider server, or perhaps a law enforcement agency. The security action may be to direct unknown user computer to a honeypot via network; that is, to direct third-party software to attach the requested account to false data account on false server. The security action may be to order third-party software to incorrectly inform unknown user computer that access to sensitive data account has been denied, thereby fooling the malicious user into thinking that information on the list is not valid when, in reality, the information is valid. The security action may be to monitor the uses to which third-party software is being put by unknown user computer unknown user computer. The security action may be to temporarily permit access to third-party software for a given account attachment, but to lower the threshold for determining that the next attachment attempt via third-party software is malicious. The security action may be to track the use of, or even the physical location of, unknown user computer. The security action may be to transmit a virus or other computer code to unknown user computer in order to determine additional information regarding unknown user computer (that is, to transmit a so-called "Trojan horse" to unknown user computer). The security action may be to permit the unknown user computer to access third-party software, but to deny future account attachment attempts from unknown user computer. The security action may be to force the user to verify the email address. The security action may be to verify a phone number. The security action may be to take a combination of any of the above-described security actions. Additionally, these examples are non-limiting; many other security actions are contemplated.

In one example, third-party software may be programmed to be lenient. The terms "lenient" or "lenient security" mean that security software is more likely than not to determine that a given account creation and/or attachment is legitimate. In other words, the term "lenient" includes the scenario that security software is programmed to weight evaluation factors or even directly lower a probability score so that the probability score is less likely to exceed a threshold. The term "lenient" also contemplates increasing the threshold without adjusting calculation of the probability score. The term "lenient" also contemplates a combination of the former and latter procedures. The term "lenient" also contemplates taking fewer or less stringent security actions relative to other security settings.

The third-party software may be programmed to be lenient in order to decrease the probability that a legitimate user becomes frustrated and no longer desires to use third-party software. For example, if a legitimate user is attempting to remember a user name and password and makes many incorrect entries, or if a legitimate user just happens to have many accounts or demonstrates other features that are sometimes indicative of a malicious user, third-party software may take an undesirable security action and thereby frustrate the legitimate user. To prevent this occurrence, third-party software may be programmed to be lenient.

The security software may also be programmed for high security. In an embodiment, a user may select a higher security setting within third-party software or security software. The terms "high security" or "higher security" refer to the opposite of lenient security described above. Thus, for example, security actions can be taken after fewer login attempts, or after fewer accounts are created. In another example, security software may be programmed to weight the calculation of probability scores in favor of a finding of malicious use, to decrease the threshold, or both. In still another example, security software can take more security actions or more stringent security actions when security software is programmed for high security.

The security software may be programmed for higher security if a user, or the manager of third-party software, desires higher security. In other embodiments, security software may be programmed with sliding security scales, with stricter or more lenient security settings as selected by a user or by the manager of third-party software.

Still other security actions or settings are contemplated, though all such security measures as used herein involve increased computer or network security with respect to the third-party software accessing, via a network, accounts on a provider's computer. Thus, the examples provided above do not necessarily limit the claims or the other examples provided herein.

The method of FIG. 5 may be varied. For example, the security software can perform ongoing analysis by extending the method as follows. First, a second request to create a second user account for the software program is received. The second request includes a second set of user credentials for accessing a second external secure account and a second unverified email address. The second external secure account controlled by the second external computer. Next, after receiving the second request and at the first internal computer, a second plurality of features comprising a second plurality of metrics is received. The second plurality of metrics describing at least creation of the second account and including at least the second unverified email address. Next, the machine learning model processing the second plurality of features and executing on the first internal computer calculates a second probability score that the second request is fraudulent. The first internal computer then compares the second probability score to a second threshold to form a second comparison result. The internal computer then performs a second security action with respect to attaching the second user account to the second external secure account in response to the second comparison result.

This extended process may be yet further extended. For example, responsive to receiving the second request to create the second user account, the second threshold can be adjusted to a lower number relative to the threshold. The second threshold may be equal to or greater than the first threshold. Alternatively, responsive to receiving the second request to create the second user account, the second probability is adjusted score upwardly relative to the probability score.

The method of FIG. 5 may be further varied by including the machine learning model training operations. Thus, for example, the method may also include training the machine learning model prior to calculating using supervised machine learning.

The method of FIG. 5 may also be extended to include the model selection process. Thus, for example, the method may also include calculating, using a plurality of machine learning models, a corresponding plurality of probability scores, each of the plurality of machine learning models using the plurality of metrics, and wherein the plurality of metrics correspond to a known attempt to fraudulently attach the first user account to the external secure account. In this case, the method also include determining which of the corresponding plurality of probability scores has a highest quality score. Also in this case, the method includes selecting a particular probability score from the corresponding plurality of probability scores that has the highest quality score. Also in this case, the method includes selecting a particular machine learning model from the plurality of machine learning models that corresponds to the highest quality score. Also in this case, the method includes using the particular machine learning model as the machine learning model.

This latter method may be yet further extended. For example, this method may also include receiving a second request to create a second user account for the software program, wherein the second request comprises a second set of user credentials for accessing a second external secure account and a second unverified email address, the second external secure account controlled by the second external computer. This extended method may also include receiving, after receiving the second request and at the first internal computer, a second plurality of features comprising a second plurality of metrics, the second plurality of metrics describing at least creation of the second account and including at least the second unverified email address. This extended method may also include calculating, by the particular machine learning model processing the second plurality of features and executing on the first internal computer, a second probability score that the second request is fraudulent. This extended method may also include comparing, by the first internal computer, the second probability score to a second threshold to form a second comparison result. This extended method may also include performing, by the first internal computer, a second security action with respect to attaching the second user account to the second external secure account in response to the second comparison result.

The method of FIG. 5 may use a wide variety of features. For example, features may be selected from the group consisting of: a login time, a login location, an internet provider address of the computer, a number of providers being accessed by the software program, an identity of a provider being accessed by the software program, a history of past attempts to attach accounts to providers, a list of account credentials obtained from a separate data source, a number of accounts created by the software program, a number of accounts deleted by the software program on the computer, a determination whether the first unverified email address contains no vowels, a credit score of a user to whom the first set of user credentials are assigned, a number of loans assigned to a user to whom the first set of user credentials are assigned, a time between account creation and a request to access a provider via the software program, an age of the first user account, a number of failed attempts to validate accounts with providers, a time since a prior attempt to validate an account with a provider, a time of account creation, a current time of day, a transaction conducted by the software program after successful validation of an account with a provider, and combinations thereof.

FIG. 6 is another flowchart diagram of a computer-implemented method for increasing security in a computer network, in accordance with one or more embodiments. The method of FIG. 6 is an alternative process for increasing security in a computer network, relative to the method of FIG. 5. The method of FIG. 6 may be implemented either on the local user's computer, an internal computer such as a third-party web server, whichever computer executed the third-party software (400), or perhaps on an external computer which monitors the third-party software (400) remotely. The method of FIG. 6 is, in any case, executed by a processor executing security software, such as the security software (402) of FIG. 4 or security software (308) of FIG. 3.

In step (602), an account creation in the third-party software or attachment to a provider sensitive account is detected by the third-party software. Account creation is described above with respect to FIG. 5.

In step (604), features are received and/or extracted features. The features may be as described above, though again features are generally information that a machine learning algorithm can use to determine a probability that malicious activity is occurring or will occur. The features are received in the case that the machine learning model simply receives the features. The features are extracted in the case that the machine learning model queries another data source for the features.

In step (606) the features are input into a machine learning model. The processor, using the machine learning model, calculates a probability score that the next account creation or attachment will be malicious (operation (608)).

In step (610), a determination is made whether the probability score is above a threshold. If not, then in step (612) access to the secured account is granted. Thus, the security action is to permit the next account creation or the next account attachment via the third-party software. If so, then in step (614) a security action is taken. The security action may be as described with respect to FIG. 5, above.

In step (616), a determination is made whether to continue to evaluate use of the third-party software. If so, then the method returns to step (602), and the method repeats. If not, then the method terminates.

The method of FIG. 6 may be varied. For example, more or fewer operations may be present. The operations shown may be varied in other embodiments. Therefore, the example shown with respect to the method does not necessarily limit the claims or the other examples described herein.

FIG. 7 is a flowchart diagram of a process for selecting the machine learning model used in the computer-implemented method shown in FIG. 6 or the security software shown in FIG. 4, in accordance with one or more embodiments. The method of FIG. 7 may be used to train and select the machine learning model from among the machine learning models shown in the machine learning engine (412) of FIG. 4. The method of FIG. 7 may be used to train and select the machine learning model discussed in the method of FIG. 6 or the method of FIG. 5. The method of FIG. 7 is performed by a computer executing machine learning models.

In step (702), "N" number of machine learning models is selected for training and testing. The number "N" may be selected as desired, and thus may be an arbitrary number. For example, machine learning models that are determined by a human to be applicable to the problem of security analysis based on features may be selected. The number "N" may be the number of such machine learning models.

Many different types of machine learning models may be selected, such as: XGBoost, random forest, feed forward, decision tree learning, association rule learning, artificial neural network, deep learning, inductive logic programming, support vector machines, and others as mentioned above. Each machine learning model has advantages and deficits, such as with respect to accuracy, training time, processing resources needed, etc.

In step (704), supervised training is performed for the "N" number of machine learning models by inputting test features corresponding to a result known by the number of machine learning models into the "N" number of machine learning models. For example, a pre-selected set of test features are provided to the machine learning model, and the technician knows ahead of time that the pre-selected set of test features corresponds to an attachment attempt that is malicious (or alternatively that the technician knows ahead of time is not malicious). The machine learning models also are instructed that the pre-selected set of test features will result in a determination that the attachment attempt is malicious, or alternatively not malicious. This type of training is known as supervised training. As a result of supervised training, the machine learning models are better able to process unknown sets of features and determine a more accurate probability score that a given attachment attempt is malicious or not malicious. Once supervised training is complete, the "N" number of machine models can be evaluated for performance.

In step (706), test sets of features are input into the "N" number of machine learning models. In this case, the machine learning models are not instructed whether or not the sets of features will result in a determination of malicious attachment or legitimate attachment. However, the human technician or automatic computer program that evaluates the performance of the machine learning models does know the expected result of the test sets of features.

In step (708), "N" probability scores are received as output from the "N" number of machine learning models. In step (710), the best machine learning model is selected. The evaluation of the best model may be performed by extracting labels from lists that human risk analysts have generated. For each of the "N" models, a weighted F-score is calculated. In statistics, the F score for binary classification is a measure of a test's accuracy. The F score considers both the precision p and the recall r of the test to compute the F score, where p is the number of correct positive results divided by the number of all positive results returned by the classifier, and r is the number of correct positive results divided by the number of all relevant samples (all samples that should have been identified as positive). The F score is the harmonic average of the precision and recall, where 1 is perfect precision and recall and 0 is the worst. As applied to selecting the machine learning model, binary classification is whether or not the attachment attempt is fraudulent. The machine learning model is the test that determines whether or not the attachment attempt is fraudulent, and the samples are the test samples that are used during the testing phase. Various formulations of the F-score may be used to determine the best machine learning model.

In another non-limiting example, the best machine model is the model producing a corresponding probability score which most closely corresponds to the known result. For example, assume two machine learning models are being evaluated. Each receives, as input, a set of features which corresponds to an attachment attempt that is known to be malicious. Thus, an ideally perfect machine learning model would calculate a 100% probability that the attachment attempt is malicious. However, the first machine learning model in this example outputs a probability score of 94% that the attachment attempt is malicious, and the second machine learning model in this example outputs a probability score of 98% that the attachment attempt is malicious. Because 98% is closer to 100% than 94%, the second machine learning model is the machine learning model selected for future probability determinations.

In step (712), the best machine learning model is selected for use in determining probability scores from future unknown sets of features. In other words, a single machine learning model is selected as being the best in a particular situation or application for evaluating the authenticity of real attachment attempts.

In step (714), a determination is made whether to re-evaluate which machine learning model to use when evaluating unknown sets of features. This determination may be used when, for example, changing conditions or situations suggest that a different machine learning model may operate better in evaluating the authenticity of ongoing attachment attempts. Rules or policies programmed into the computer can make this determination, or alternatively a human technician can instruct the computer to make this determination. In any case, if the decision at step (714) is "yes" (re-evaluate), then the method returns to step (702). Otherwise, the method terminates.

Steps 710-714 may be performed multiple times during runtime. In particular, "M" machine learning models is may be used during run time for each time in which a machine learning model is applied. The number "M" is less than or equal to the number "N"; e.g., the number of machine learning models to be used during run time is less than or equal to the number of machine learning models that have been trained and tested. During runtime, for each of the "M" uses of a machine learning model, a machine learning model is selected from the collection of "N" trained machine learning models.

In one non-limiting embodiment, a decision-tree machine learning model may be selected as the preferred model due to greater ease of human interpretation. In another non-limiting embodiment, a pre-selected list of prioritized machine learning models may be created, and a given machine learning model selected for use at run time according to the particular priority assigned to a particular machine learning model for the particular execution time.

For example, a machine learning model may be used during run time at five different points: the first time the user tries to attach an account, the second time the user tries to attach an account, etc., until the fifth time the user tries to attach an account. Each of the times a model is used during run time, the machine learning model that is selected for use is selected from among the "N" number of machine learning models. The machine learning model may be selected as described above with reference to Step 710 with regards to the particular attachment attempt. Thus, a first machine learning model may be selected for an initial attachment attempt while a second machine learning model is selected for the last attachment attempt when the first machine learning model performed better in testing for earlier attachment attempts and the second machine learning model performed better in testing for the later attachment attempts.

The method of FIG. 7 may be varied. For example, more or fewer operations may be present. The operations shown may be varied in other embodiments. Therefore, the example shown with respect to the method does not necessarily limit the claims or the other examples described herein.

Attention is now turned to different features can be used as factors in the machine learning determination of a probability that a given attachment attempt is malicious. FIG. 8A through FIG. 15 are all examples of such features. In most cases, no one feature is dispositive that a given attachment attempt is malicious. However, when many such features are provided to a machine learning model, patterns in the features can emerge such that a machine learning model can evaluate a reasonably accurate probability score that a given attachment attempt is malicious. The term "reasonably accurate probability score" is defined as a probability score that, given a probability score indicating that a given attachment attempt is more likely than not malicious, an ordinary computer security technician would be prompted to take a security action with respect to that attachment attempt even though a chance remains that the security technician could be undesirably interfering with a legitimate attachment attempt. A probability score may be deemed reasonably accurate when produced by a machine learning model that has been validated against a known set of features that correspond to a known malicious attachment attempt. From the computer perspective, reasonably accurate is determined based on a comparison to a threshold. A probability score may also be "accurate enough" when the ordinary artisan exercises ordinary professional judgement to trust the machine learning model that produces the probability score.

Figure 8B:
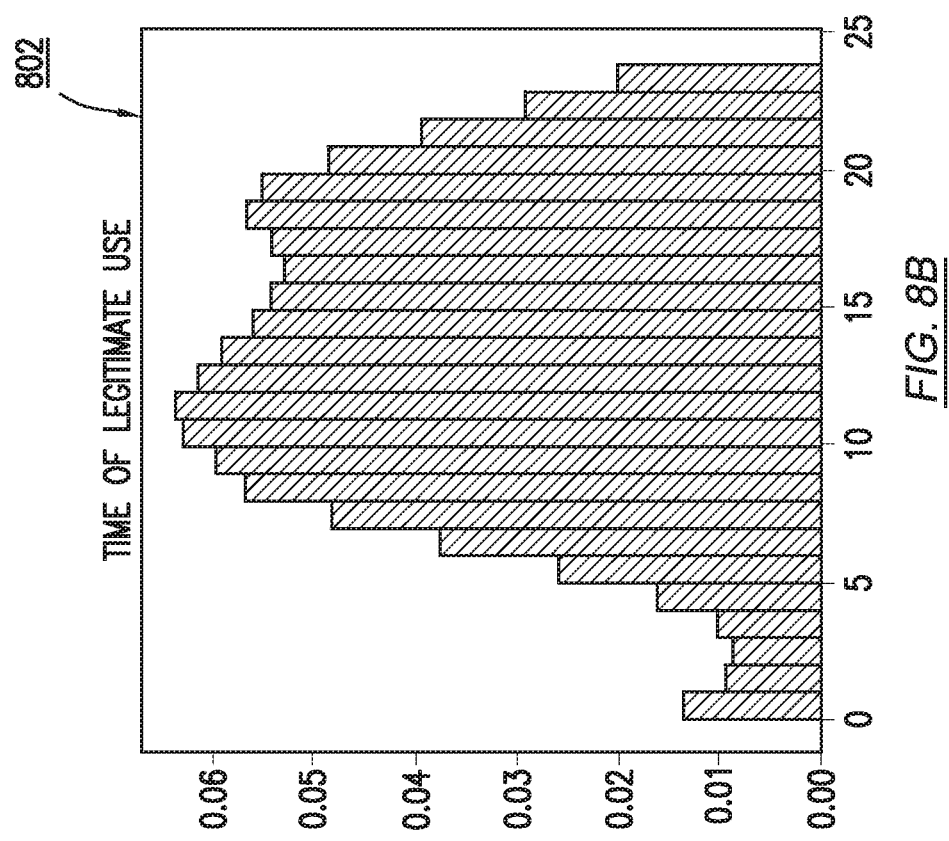
Figure 8A:
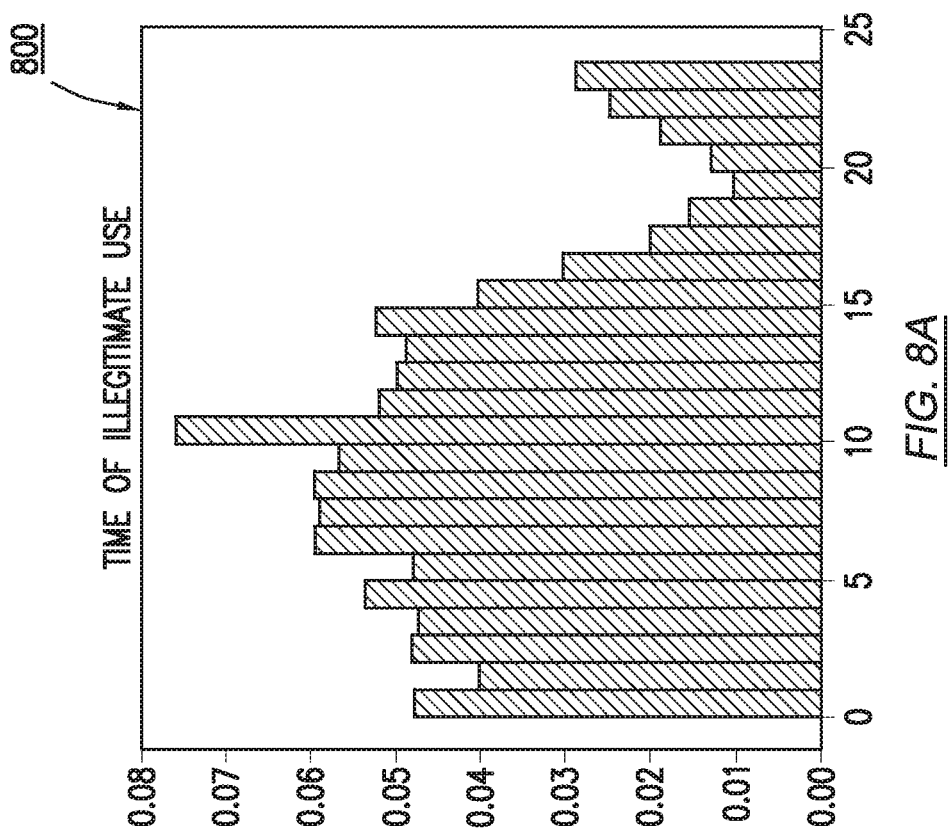

FIG. 8A is a graph of hours of the day versus percentage of malicious users being present, and more particularly is an example of features useable in the machine learning models described herein, in accordance with one or more embodiments. Graph (800) shows only illegitimate use, or malicious attachment attempts, and the time of day in which those malicious attachment attempts were made (on a 24-hour clock). As can be seen in graph (800), malicious users are most often initiating malicious attachment attempts at about 11:00 in the morning, but more generally operate between midnight and 15:00 in the afternoon (3:00 on a 12-hour clock). This fact means that the time of day that an attachment attempt is made can be used as a feature that factors into the machine learning determination of a probability that a given attachment attempt or the next attachment attempt is malicious.

FIG. 8B is a graph of hours of the day versus percentage of legitimate users being present, and more particularly is an example of features useable in the machine learning models described herein, in accordance with one or more embodiments. In contrast to graph (800), graph (802) shows only legitimate use, or legitimate attachment attempts, and the time of day in which those legitimate attempts were made (on a 24-hour clock). As can be seen in graph (802), legitimate users are most often initiating malicious attachment attempts at about 11:00 in the morning, but more generally operate between 8:00 in the morning and 21:00 at night (9:00 on a 12-hour clock). This fact means that the time of day that an attachment attempt is made can be used as a feature that factors into the machine learning determination of a probability that a given attachment attempt or the next attachment attempt is malicious.

FIG. 8A and FIG. 8B are only examples of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features. Additional examples of features are shown in FIG. 9 through FIG. 15.

FIG. 9 is a table of user type versus provider identity, and more particularly is an example of features useable in the machine learning models described herein, in accordance with one or more embodiments. Table (900) shows that different providers are more likely to be the target of a malicious attachment attempt. In a specific non-limiting example, the providers interacting with the third-party software are banking organizations, in which case, a given provider is a specifically named banking organization. In this specific example shown in FIG. 9, "Provider A" is more likely than the other two providers to be the subject of both legitimate and illegitimate attachment attempts by the third-party software, but relatively speaking "Provider A" is more likely than the other two to be subjected to illegitimate attachment attempts. This fact means that the identity of the provider to which the attachment attempt is made can be used as a feature that factors into the machine learning determination of a probability that a given attachment attempt or the next attachment attempt is malicious.

FIG. 9 is only an example of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features.

FIG. 10 is a table of user type versus percentage of users having email addresses with no vowels, and more particularly is an example of features useable in the machine learning models described herein, in accordance with one or more embodiments. Table (1000) shows that email addresses provided to the third-party software that have no vowels are more likely to be present in illegitimate attachment attempts relative to legitimate attachment attempts.

This fact means that unverified email addresses provided to the third-party software that has no vowels, or is otherwise nonsensical to a human viewer, can be used as a feature that factors into the machine learning determination of a probability that a given attachment attempt or the next attachment attempt is malicious. However, FIG. 10 is only an example of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features.

Figure 11:
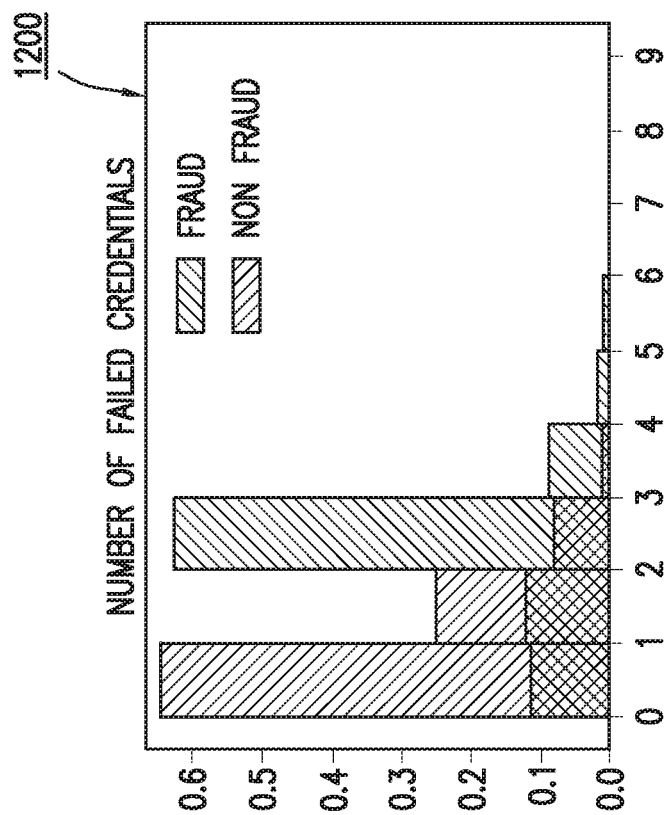

FIG. 11 is a graph of number of providers versus incidence of malicious and legitimate users, and more particularly is an example of features useable in the machine learning models described herein, in accordance with one or more embodiments. Graph (1100) shows that when the third-party software is instructed to attach to the accounts of only a single provider, the probability of fraudulent attachment attempts is significantly higher. This fact means that the number of providers to which the third-party software is being requested to attach accounts can be used as a feature that factors into the machine learning determination of a probability that a given attachment attempt or the next attachment attempt is malicious.

FIG. 11 is only an example of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features.

Figure 12:
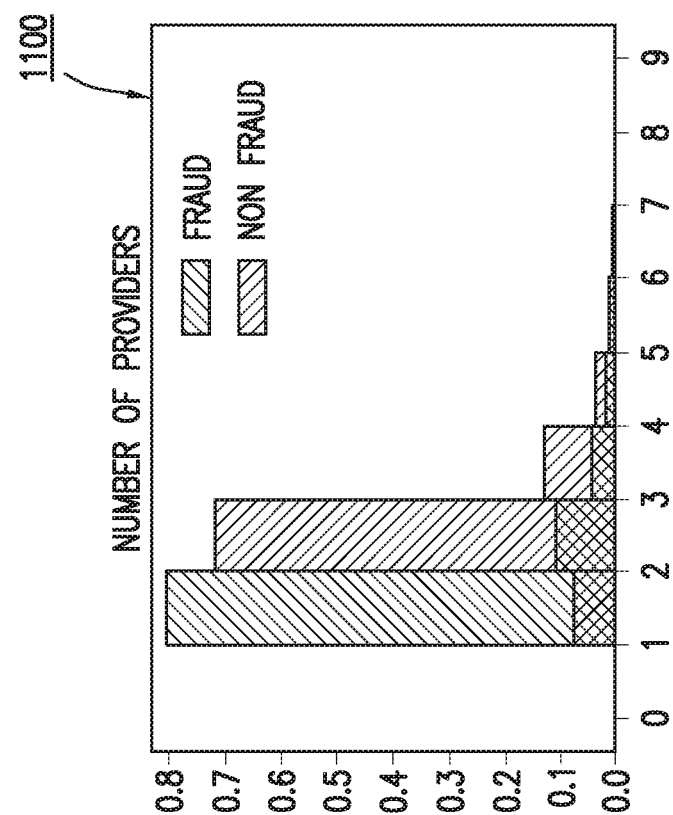

FIG. 12 is a graph of number of failed credentials or failed account attachments versus incidence of malicious and legitimate users, and more particularly is an example of features useable in the machine learning models described herein, in accordance with one or more embodiments. Graph (1200) shows that the probability of a particular attachment, or the next attachment attempt, being fraudulent increases the more times user credentials fail to authenticate. This fact means that the number of times user credentials fail to attach to provider accounts can be used as a feature that factors into the machine learning determination of a probability that a given attachment attempt or the next attachment attempt is malicious.

FIG. 12 is only an example of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features.

Figure 13:
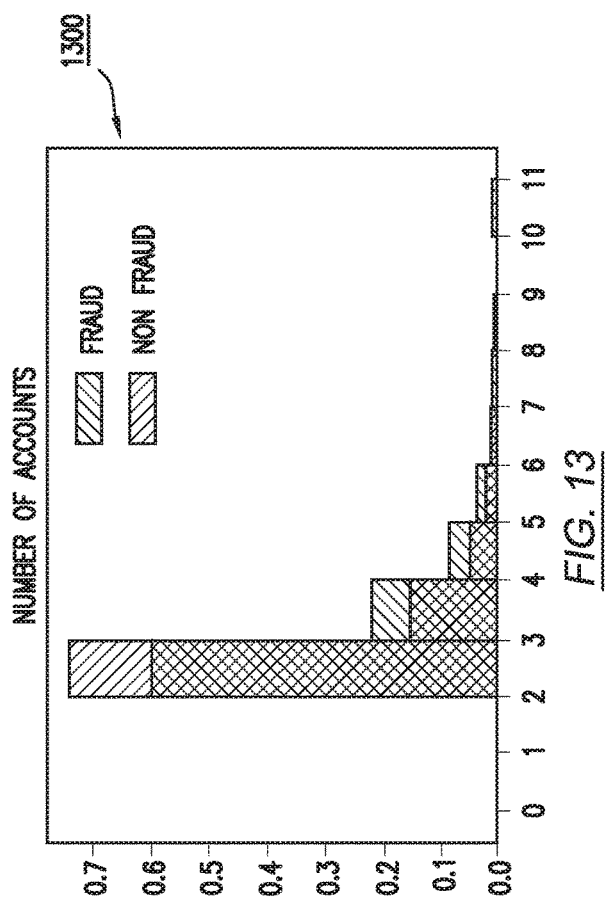

FIG. 13 is a graph of the number of accounts being used in the third-party software described herein, and more particularly is an example of features useable in the machine learning models described herein, in accordance with one or more embodiments. Graph (1300) shows that the more accounts are registered with the third-party software, the greater the probability that a given attachment attempt or the next attachment attempt will be fraudulent. This fact means that the number of accounts registered with the third-party software can be used as a feature that factors into the machine learning determination of a probability that a given attachment attempt or the next attachment attempt is malicious.

FIG. 13 is only an example of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features.

Figure 14:
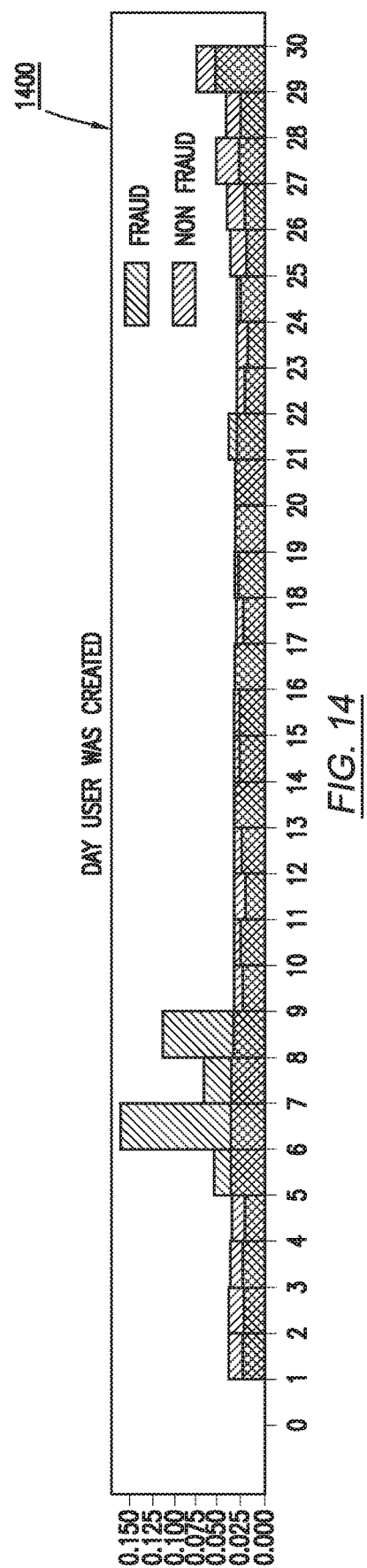

FIG. 14 is a graph of a day of the month when a user account was created versus incidence of malicious and legitimate users, and more particularly is an example of features useable in the machine learning models described herein, in accordance with one or more embodiments. Graph (1400) shows that fraudulent attachment attempts are more likely during early days of a given month, particularly between the fifth and ninth days of a given month. This fact means that the day of the month that the attachment attempt is made factors into the machine learning determination of a probability that a given attachment attempt or the next attachment attempt is malicious FIG. 14 is only an example of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features.

Figure 15:
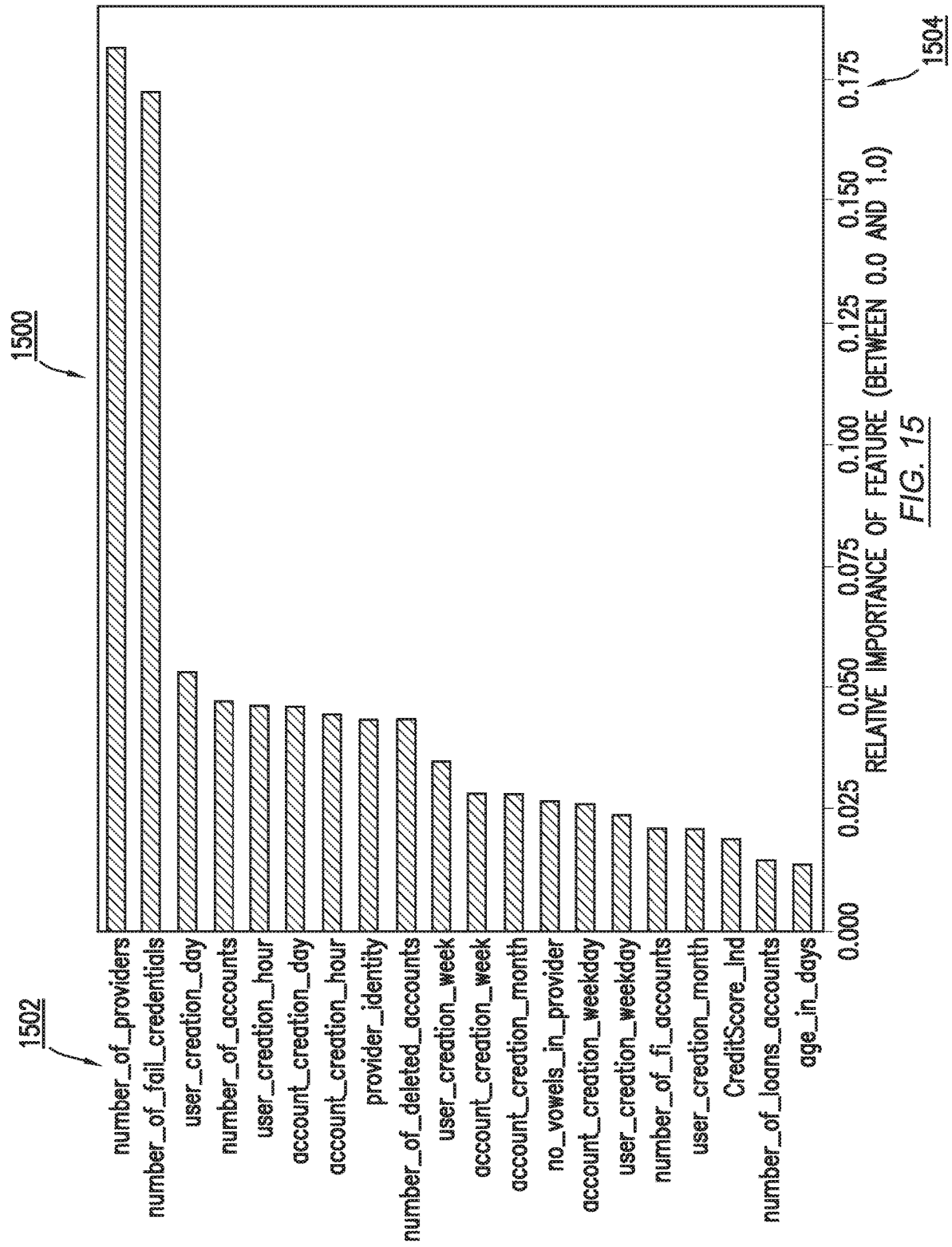

FIG. 15 is a graph of the relative importance of a feature versus the feature type, and more particularly is an example of the weights of features useable in the machine learning models described herein, in accordance with one or more embodiments. Graph (1500) shows, on axis (1502), a non-exhaustive list of features that might be used as factors in a machine learning determination of a probability that a given attachment attempt or the next attachment attempt is malicious. Graph (1500) shows, on axis (1504), the relative importance of a feature with respect to its usefulness or influence on determining whether a given attachment attempt or the next attachment attempt will be malicious or fraudulent.

The relative importance of a feature is a value between zero and one, with the sum of the relative importance of all features being measured equal to one. As can be seen on graph (1500), the "number of providers" and the "number of failed credentials" have the highest importance relative to the other features that were used for determining whether a particular attachment attempt, or the next attachment attempt, will be fraudulent. However, this relative importance can vary over time and with respect to different features not necessarily shown here.

Nevertheless, the relative importance of a feature being used in the machine learning model to determine the probability of fraudulent attachment may be used to weight the relative importance of a given feature. In other words, the machine learning model can learn to give more weight to the features of the number of providers and the number of failed credentials relative to the other features when deciding whether a given attachment attempt or the next attachment attempt will be fraudulent.

FIG. 15 is only an example of features that may be used with respect to the security software (402) of FIG. 4, the method of FIG. 5, the method of FIG. 6, or the method of FIG. 7. As described elsewhere herein, many other different types of features may be used, and the ordinary artisan could contemplate the use of other related security features.

Figure 16A:
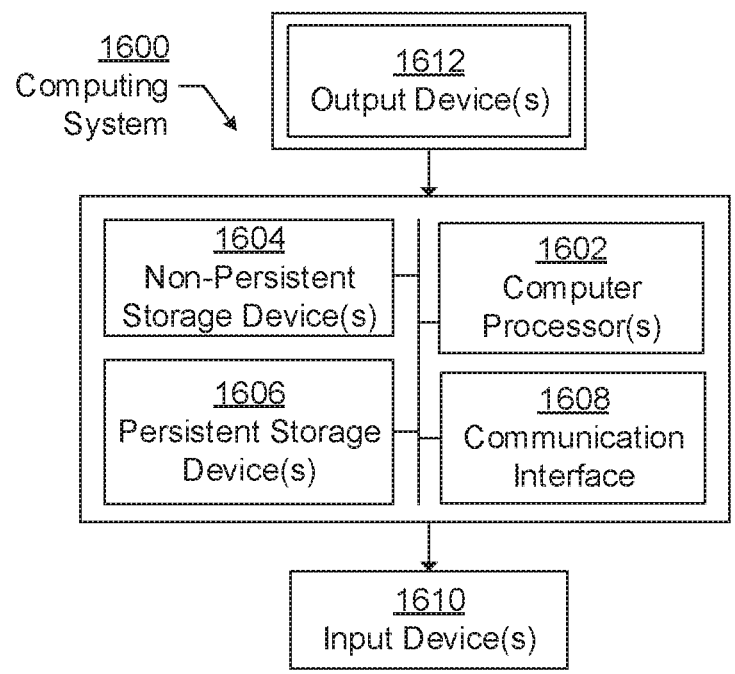
FIG. 16A and FIG. 16B depict diagrams showing a computing system, in accordance with one or more embodiments.
Figure 16B:
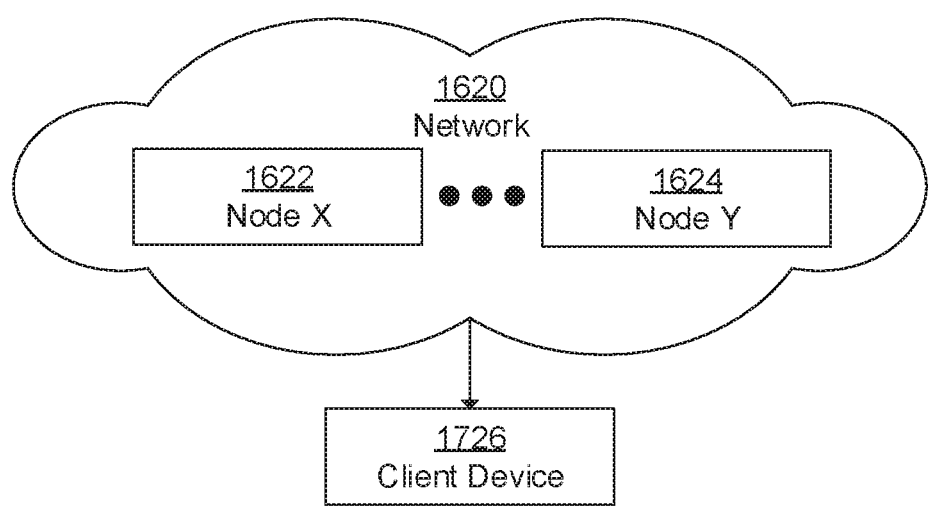

Embodiments of the disclosure may be implemented on a computing system in a network environment. Any combination of mobile, desktop, server, embedded, or other types of hardware may be used. FIG. 16A and FIG. 16B are diagrams showing a computing system and a network, in accordance with one or more embodiments of the disclosure. As shown in FIG. 16A, the computing system (1600) may include one or more computer processor(s) (1602), one or more associated non-persistent storage device(s) (1604) (e.g., random access memory (RAM), cache memory, flash memory, etc.), one or more persistent storage device(s) (1606) (e.g., a hard disk, an optical drive such as a compact disk (CD) drive or digital versatile disk (DVD) drive, a flash memory stick, etc.), and numerous other elements and functionalities such as communication interface (1608).

The computer processor(s) (1602) may be an integrated circuit for processing instructions. For example, the computer processor(s) may be one or more cores, or micro-cores of a processor.

The computing system (1600) may also include one or more input device(s) (1610), such as a touchscreen, keyboard, mouse, microphone, touchpad, electronic pen, or any other type of input device. Further, the computing system (1600) may include one or more output device(s) (1612), such as a screen (e.g., a liquid crystal display (LCD), a plasma display, touchscreen, cathode ray tube (CRT) monitor, projector, or other display device), a printer, external storage, or any other output device. One or more of the output device(s) (1612) may be the same or different from the input device(s).

The computing system (1600) may be connected to a network (1620 of FIG. 16B) (e.g., a local area network (LAN), a wide area network (WAN) such as the Internet, mobile network, or any other type of network) via a network interface connection (not shown). The input device(s) (1610) and output device(s) (1612) may be locally or remotely (e.g., via the network 1620) connected to the computer processor(s) (1602), non-persistent storage device(s) (1604), and persistent storage device(s) (1606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure.

Further, one or more elements of the aforementioned computing system (1600) may be located at a remote location and connected to the other elements over a network (1620). Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

The computing system (1600) in FIG. 16A may be connected to or be a part of a network. For example, as shown in FIG. 16B, the network (1620) may include multiple nodes (e.g., node X (1622) and node Y (1624)). Each node may correspond to a computing system, such as the computing system shown in FIG. 16A, or a group of nodes combined may correspond to the computing system shown in FIG. 16A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1600) may be located at a remote location and connected to the other elements over a network.

Although not shown in FIG. 16B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1622) and node Y (1624)) in the network (1620) may be configured to provide services for a client device (1626). For example, the nodes may be part of a cloud computing system. The nodes may include functionality to receive requests from the client device (1626) and transmit responses to the client device (1626). The client device (1626) may be a computing system, such as the computing system shown in FIG. 16A. Further, the client device (1626) may include and/or perform all or a portion of one or more embodiments of the disclosure.

The computing system or group of computing systems described in FIGS. 16 and 17 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 16A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 16A and the nodes and/or client device in FIG. 16B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for increasing security in a computer network, the method comprising:
receiving, in a software program executing on a first internal computer, a first request to attach a first user account for the software program to an external secure account, wherein the first request comprises a first set of user credentials for accessing the external secure account and a first unverified email address, the external secure account controlled by a second external computer;

receiving, after receiving the first request and at the first internal computer, a plurality of features comprising a plurality of metrics, the plurality of metrics describing at least creation of the first user account and including at least the first unverified email address;

calculating, by a machine learning model processing the plurality of features and executing on the first internal computer, a probability score that the first request is fraudulent;

comparing, by the first internal computer, the probability score to a first threshold to form a comparison result; and performing, by the first internal computer, a security action with respect to attaching the first user account to the external secure account in response to the comparison result.

2. The method of claim 1, further comprising:

receiving a second request to create a second user account;

repeating receiving the plurality of features;

calculating a second probability score that the second request is fraudulent, wherein calculating the second probability score takes into account a presence of the first request;

comparing the second probability score to a second threshold to form a second comparison result; and performing, by the first internal computer, a second security action with respect to attaching the second user account to the external secure account in response to the second comparison result.

3. The method of claim 2, further comprising:

responsive to receiving the second request to create the second user account, adjusting the second threshold to a lower number relative to the first threshold.

4. The method of claim 2, wherein the second threshold is equal to or greater than the first threshold.

5. The method of claim 2, further comprising:

responsive to receiving the second request to create the second user account, adjusting the second probability score upwardly relative to the probability score.

6. The method of claim 1, wherein performing the security action comprises:

responsive to the probability score being less than the first threshold, transmitting instructions to create the first user account and transmitting instructions to attach the first user account to the external secure account.

7. The method of claim 1, further comprising:

training the machine learning model prior to calculating using supervised machine learning.

8. The method of claim 7, further comprising:

calculating, using a plurality of machine learning models, a corresponding plurality of probability scores, each of the plurality of machine learning models using the plurality of metrics, and wherein the plurality of metrics correspond to a known attempt to fraudulently attach the first user account to the external secure account;

determining which of the corresponding plurality of probability scores has a highest quality score;

selecting a particular probability score from the corresponding plurality of probability scores that has the highest quality score;

selecting a particular machine learning model from the plurality of machine learning models that corresponds to the highest quality score; and using the particular machine learning model as the machine learning model.

9. A non-transitory computer readable storage medium storing instructions for increasing security in a computer network, the instructions, when executed by a computer processor, comprising:

program code for receiving a first request to attach a first user account for a software program to an external secure account, wherein the first request comprises a first set of user credentials for accessing the external secure account and a first unverified email address, the external secure account controlled by an external computer;

program code for receiving, after receiving the first request, a plurality of features comprising a plurality of metrics, the plurality of metrics describing at least creation of the first user account and including at least the first unverified email address;

program code for calculating, by a machine learning model processing the plurality of features, a probability score that the first request is fraudulent;

program code for comparing the probability score to a first threshold to form a comparison result; and program code for performing a security action with respect to attaching the first user account to the external secure account in response to the comparison result.

10. The non-transitory computer readable storage medium of claim 9, wherein the instructions further comprise:

program code for receiving a second request to create a second user account;

program code for repeating receiving the plurality of features;

program code for calculating a second probability score that the second request is fraudulent, wherein calculating the second probability score takes into account a presence of the first request;

program code for comparing the second probability score to a second threshold to form a second comparison result; and program code for performing a second security action with respect to attaching the second user account to the external secure account in response to the second comparison result.

11. The non-transitory computer readable storage medium of claim 10, wherein the instructions further comprise:

program code for, responsive to receiving the second request to create the second user account, adjusting the second threshold to a lower number relative to the first threshold.

12. The non-transitory computer readable storage medium of claim 10, wherein the second threshold is equal to or greater than the first threshold.

13. The non-transitory computer readable storage medium of claim 10, wherein the instructions further comprise:

program code for, responsive to receiving the second request to create the second user account, adjusting the second probability score upwardly relative to the probability score.

14. The non-transitory computer readable storage medium of claim 9, wherein the instructions further comprise:

program code for, responsive to the probability score being less than the first threshold, transmitting instructions to create the first user account and transmitting instructions to attach the first user account to the external secure account.

15. The non-transitory computer readable storage medium of claim 9, wherein the instructions further comprise:
program code for training the machine learning model prior to calculating using supervised machine learning.

16. The non-transitory computer readable storage medium of claim 15, wherein the instructions further comprise:
program code for calculating, using a plurality of machine learning models, a corresponding plurality of probability scores, each of the plurality of machine learning models using the plurality of metrics, and wherein the plurality of metrics correspond to a known attempt to fraudulently attach the first user account to the external secure account;
program code for determining which of the corresponding plurality of probability scores has a highest quality score;
program code for selecting a particular probability score from the corresponding plurality of probability scores that has the highest quality score;
program code for selecting a particular machine learning model from the plurality of machine learning models that corresponds to the highest quality score; and
program code for using the particular machine learning model as the machine learning model.

17. A computer system comprising:
a processor; and
a data storage device storing security software executable by the processor, the security software comprising:
a data extractor configured to perform at least one of receiving and extracting a plurality of selected features from a plurality of data sources;
a machine learning engine comprising a machine learning model that takes as input the plurality of selected features and has as output a probability score representative of a probability that a given account attachment attempt by third-party software to attach an account to a sensitive data account is malicious;
an evaluation engine comprising a probability comparator that compares the probability score to a first threshold to form an evaluation result; and
a security engine configured to perform a security action based on the evaluation result.

18. The computer system of claim 17, wherein the security engine is further configured to:
responsive to the probability score being less than the first threshold, transmit a signal to an account creator to create a user account and to transmit an account attachment request to the sensitive data account; and
responsive to the probability score being equal to or greater than the first threshold, to take the security action.

19. The computer system of claim 18, wherein the security engine is further configured to perform at least one of:
instruct the account creator to deny attachment of the account to the sensitive data account;
deny transmission of a set of user credentials to the sensitive data account;
prevent further access to the third-party software;
monitor future use of the third-party software; and
attach the account to a false sensitive data account on a different server.

20. The computer system of claim 17, wherein the machine learning engine further comprises a plurality of models and wherein the evaluation engine further comprises:
a model quality determinator configured to evaluate corresponding quality scores of the plurality of machine learning models; and
a model selector configured to select a particular machine learning model as having a highest quality score among the corresponding quality scores, the particular machine learning model being the machine learning model.

* * * * *